US008649590B2

(12) United States Patent
Fu

(10) Patent No.: US 8,649,590 B2
(45) Date of Patent: Feb. 11, 2014

(54) PAPER SHEET MANAGEMENT APPARATUS, PAPER SHEET MANAGEMENT METHOD, AND PAPER SHEET MANAGEMENT PROGRAM

(75) Inventor: Gui Fu, Tokyo-To (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 247 days.

(21) Appl. No.: 12/998,142

(22) PCT Filed: Sep. 22, 2008

(86) PCT No.: PCT/JP2008/067131

§ 371 (c)(1),
(2), (4) Date: Mar. 22, 2011

(87) PCT Pub. No.: WO2010/032335

PCT Pub. Date: Mar. 25, 2010

(65) Prior Publication Data

US 2011/0170761 A1 Jul. 14, 2011

(51) Int. Cl.
*G06K 9/00* (2006.01)

(52) U.S. Cl.
USPC .......... 382/135

(58) Field of Classification Search
USPC .......... 382/112, 135, 137, 321; 209/534; 235/379; 356/71; 902/7
See application file for complete search history.

(56) References Cited

U.S. PATENT DOCUMENTS 4,876,735 A * 10/1989 Martin et al. .......... 382/310
5,717,776 A * 2/1998 Watanabe .......... 382/116
6,550,671 B1 4/2003 Brown et al.
7,866,545 B2 * 1/2011 Rapf et al. .......... 235/379
8,064,700 B2 * 11/2011 King et al. .......... 382/181

(Continued)

FOREIGN PATENT DOCUMENTS

EP 1 437 692 A1 7/2004
EP 1 531 423 A2 5/2005

(Continued)

OTHER PUBLICATIONS

EP Search Report (Application No. 08876990.6—PCT/JP2008/067131) (6 pages—dated Sep. 17, 2012).

(Continued)

*Primary Examiner* — Shervin Nakhjavan
(74) *Attorney, Agent, or Firm* — Renner, Kenner, Greive, Bobak, Taylor & Weber

(57) ABSTRACT

A paper sheet management apparatus includes: a serial number recognizing unit 38A that performs a character recognition of a serial number of predetermined digits for recognizing a banknote from the banknote, obtains a character recognition result including a recognizable character and/or an unrecognizable character, and obtains a serial number recognition result including a recognizable determined character and/or an unrecognizable error character based on the obtained character, recognition result; a serial number registration condition processing unit 38B that judges whether the serial number recognition result meets a predetermined registration condition based on the determined character or the error character in the obtained serial number recognition result; and a DB control unit 38E that registers banknote detailed information including the serial number recognition result in a database 33, when the serial number recognition result meets the predetermined registration condition, and forbids registration of the serial number recognition result in the database 33, when the serial number recognition result does not meet the predetermined registration condition. Thus, needless registration of serial numbers can be avoided, and an operational burden on a user who inputs a serial number can be significantly reduced.

14 Claims, 14 Drawing Sheets

(56) References Cited

U.S. PATENT DOCUMENTS

| | | | | |
|---|---|---|---|---|
| 8,411,958 | B2 * | 4/2013 | Rieman | 382/187 |
| 2004/0016797 | A1 * | 1/2004 | Jones et al. | 235/379 |
| 2004/0238619 | A1 * | 12/2004 | Nagasaka et al. | 235/379 |
| 2006/0045322 | A1 * | 3/2006 | Clarke et al. | 382/137 |
| 2006/0086783 | A1 * | 4/2006 | Tredeau et al. | 235/379 |
| 2006/0210197 | A1 * | 9/2006 | Suenaga et al. | 382/321 |
| 2006/0219773 | A1 * | 10/2006 | Richardson | 235/379 |
| 2007/0242307 | A1 * | 10/2007 | Saikawa et al. | 358/1.16 |
| 2008/0137971 | A1 * | 6/2008 | King et al. | 382/229 |
| 2008/0219543 | A1 * | 9/2008 | Csulits et al. | 382/135 |

FOREIGN PATENT DOCUMENTS

| | | | |
|---|---|---|---|
| JP | 2003-331214 | | 11/2003 |
| JP | 2004-213559 | | 7/2004 |
| RU | 2 158 443 | C1 | 10/2000 |
| RU | 2 273 052 | C2 | 3/2006 |
| RU | 2 280 284 | C2 | 7/2006 |
| WO | WO 2006/005475 | A1 | 1/2006 |

OTHER PUBLICATIONS

Russian Office Action with English Translation (Application No. 2012105931) (5 pages—dated Feb. 26, 2013).

Notice of Allowance issued May 24, 2013 to Russian Application No. 201205931 (12 pages).

Notice of Allowance issued Dec. 16, 2011 to Russian Application No. 2011115809 (18 pages).

Japanese Office Action with English Translation (Japanese Application No. 2010-529566) (3 pages—dated Aug. 23, 2013).

* cited by examiner

PAPER SHEET MANAGEMENT APPARATUS, PAPER SHEET MANAGEMENT METHOD, AND PAPER SHEET MANAGEMENT PROGRAM

FIELD OF THE INVENTION

The present invention relates to a paper sheet management apparatus, a paper sheet management method, and a paper sheet management program, which perform a character recognition of identification information, such as a serial number of predetermined digits (characters) for recognizing a paper sheet such as a banknote, from the paper sheet, and register the recognized identification information in a database.

BACKGROUND ART

Generally, on a paper sheet such as a banknote, a check, a draft, a coupon, etc., identification information that uniquely specifies the paper sheet for recognizing the paper sheet is described.

In recent years, in a financial institute, for example, there has been known a paper sheet management apparatus such as a banknote management apparatus that recognizes a serial number (characters) from a banknote, and registers the recognized serial number in a database, so as to manage banknotes handled by the financial institution (see, Patent Document 1, for example).

In addition, in foreign countries, since there are a lot of complaints that a counterfeit note has been dispensed from an automatic teller machine (hereinafter referred to simply as "ATM") of a financial institution, the financial institution is required to manage banknotes based on serial numbers so as to know whether the counterfeit note is a banknote that has been actually handled by the financial institution.

The financial institution can respond to a complaint that a counterfeit note has been dispensed therefrom in the following manner. A serial number of the banknote (counterfeit note) is inputted as information to be searched, and the serial number to be searched is searched from a database, so as to recognize whether or not the banknote having the serial number is a banknote that has been handled by the financial institute in the past.

However, in the above conventional paper sheet management apparatus, when a serial number of predetermined digits is recognized from a banknote, it often occurs that the serial number on the banknote surface cannot be recognized, depending on a condition of the banknote such as stains on the banknote surface.

In addition, when the paper sheet management apparatus recognizes serial numbers of respective banknotes and simply registers, in a database, a serial number including a character which cannot be recognized as a character (unrecognizable character), as well as recognized serial numbers, a memory capacity of the database is uselessly used.

Thus, in the paper sheet management apparatus, a serial number including an unrecognizable character is inputted by a user, so as to register the inputted serial number in the database. As a result, useless registration of serial numbers in the database can be avoided.

Patent Document 1: JP2004-213559A

DISCLOSURE OF THE INVENTION

Problem to be Solved by the Invention

In the above conventional paper sheet management apparatus, a serial number including an unrecognizable character is inputted by a user. However, when there are a large number of banknotes whose serial numbers include unrecognizable characters, a user who inputs the serial numbers carries a heavy burden.

The present invention has been made in view of the above circumstances. The object of the present invention is to provide a paper sheet management apparatus, a paper sheet management method and a paper sheet management program that can avoid useless registration of a serial number (identification information) and can significantly reduce an operational burden on a user who inputs a serial number (identification information).

Means for Solving the Problem

In order to achieve the aforementioned object, a paper sheet management apparatus recited in claim 1 is a paper sheet management apparatus including: an identification information recognizing unit that performs a character recognition of identification information of predetermined digits for recognizing a paper sheet from the paper sheet, obtains a character recognition result including a recognizable character and/or an unrecognizable character, and obtains an identification information recognition result including a recognizable determined character and/or an unrecognizable undetermined character based on the obtained character recognition result; a registration condition judgment unit that judges whether the identification information recognition result meets a predetermined registration condition or not, based on the determined character or the undetermined character in the identification information recognition result which has been obtained by the identification information recognizing unit; and a registration control unit that registers the identification information recognition result in a storage unit when the registration condition judgment unit judges that the identification information recognition result meets the predetermined registration condition, and forbids registration of the identification information recognition result in the storage unit when the registration condition judgment unit judges that the identification information recognition result does not meet the predetermined registration condition.

In addition, the paper sheet management apparatus recited in claim 2 according to claim 1 includes a specific digit designating unit that designates a given specific digit among the predetermined digits of the identification information recognition result, wherein the registration condition judgment unit judges that: the identification information recognition result meets the predetermined registration condition when a character of the specific digit in the identification information recognition result, which has been designated by the specific digit designating unit, is the determined character; and judges that the identification information recognition result does not meet the predetermined registration condition when a character of the specific digit in the identification information recognition result, which has been designated by the specific digit designating unit, is the undetermined character.

In addition, the paper sheet management apparatus recited in claim 3 according to claim 1 includes a unit for designating an allowable number of undetermined characters that designates the allowable number of the undetermined characters among the predetermined digits of the identification information recognition result, wherein the registration condition judgment unit judges that: the identification information recognition result meets the predetermined registration condition when a total number of the undetermined characters in the identification information recognition result is equal to or less than the allowable number of undetermined characters which has been designated by the unit for designating the allowable number of undetermined characters; and judges that the identification information recognition result does not meet the predetermined registration condition when the total number of the undetermined characters in the identification information recognition result exceeds the allowable number of undetermined characters which has been designated by the unit for designating the allowable number of undetermined characters.

In addition, the paper sheet management apparatus recited in claim 4 according to claim 1 includes a specific digit designating unit that designates a given specific digit among the predetermined digits of the identification information recognition result; and a unit for designating an allowable number of undetermined characters that designates the allowable number of the undetermined characters among the predetermined digits of the identification information recognition result; wherein the registration condition judgment unit judges that: the identification information recognition result meets the predetermined registration condition when a character of the specific digit in the identification information recognition result, which has been designated by the specific digit designating unit, is the determined character, and when a total number of the undetermined characters in the identification information recognition result is equal to or less than the allowable number of undetermined characters which has been designated by the unit for designating the allowable number of undetermined characters; and judges that the identification information recognition result does not meet the predetermined registration condition when a character of the specific digit in the identification information recognition result, which has been designated by the specific digit designating unit, is the undetermined character, or when the total number of the undetermined characters in the identification information recognition result exceeds the allowable number of undetermined characters which has been designated by the unit for designating the allowable number of undetermined characters.

In addition, the paper sheet management apparatus recited in claim 5 according to any one of claims 1 to 4 includes an inputting operation demanding unit that demands an inputting operation for the identification information recognition result, when the registration control unit judges that the identification information recognition result does not meet the predetermined registration condition, wherein, when an inputting operation for the identification information recognition result in response to the inputting operation demanding unit is detected, the registration control unit registers the inputted identification information in the storage unit.

In addition, the paper management apparatus recited in claim 6 according to any one of claims 1 to 4 includes an information-to-be-searched inputting unit that inputs identification information to be searched; and a search control unit that searches an identification information recognition result approximate to the identification information to be searched which has been inputted by the information-to-be-searched inputting unit, from the identification information recognition result including the determined character and/or the undetermined character registered in the storage unit.

In addition, in the paper sheet management apparatus recited in claim 7 according to any one of claims 1 to 4, the identification information recognizing unit includes: a character recognizing unit that performs a character recognition on a plurality of pieces of identification information of the same contents from the paper sheet, and obtains character recognition results about the respective identification information including a recognizable character and/or an unrecognizable character; a comparing unit that compares the character recognition results of the respective identification information for each digit, which have been obtained by the character recognizing unit; a character determining unit that determines: when all the characters of the corresponding digit in the character recognition results which have been compared with each other by the comparing unit are the same recognizable character, the character as the determined character of the corresponding digit; the character determining unit determining, when characters of the corresponding digit in the character recognition results are different characters including at least one recognizable character, a given character among these different characters as the determined character of the corresponding digit; and the character determining unit determining, when all the characters of the corresponding digit in the character recognition results are unrecognizable characters, the character as the undetermined character of the corresponding digit; and an identification information recognition result obtaining unit that obtains the identification information recognition result including the determined character and/or the undetermined character, after the characters of all the digits in the character recognition results, have been determined by the character determining unit.

In addition, in the paper sheet management apparatus recited in claim 8 according to claim 7, when the characters of the corresponding digit in the character recognition results are different characters including at least one recognizable character, and a given character of these different characters is determined as the determined character of the corresponding digit, the character determining unit determines, as the determined character of the corresponding digit, a character of the corresponding digit in the character recognition result having the smallest total number of the unrecognizable characters among the plurality of character recognition results.

In addition, the paper sheet management apparatus recited in claim 9 according to claim 7 includes a priority order storage unit that stores a priority order of the plurality of identification information of the same contents on the paper sheet, wherein when the characters of the corresponding digit in the character recognition results are different characters including at least one recognizable character, and a given character of these different characters is determined as the determined character of the corresponding digit, the character determining unit determines, as the determined character of the corresponding digit, a character of the corresponding digit of the character recognition result whose priority order is higher which is stored in the priority storage unit, among the plurality of character recognition results.

In addition, the paper sheet management apparatus recited in claim 10 according to claim 7 includes a coincide rate calculating unit that calculates a coincidence rate in which the recognizable characters of the corresponding digit in the plurality of character recognition results, which have been compared with each other by the comparing unit, coincide with each other; and an allowable coincidence rate designating unit that designates an allowable coincidence rate; wherein the registration condition judgment unit judges that the identification information recognition result does not meet the predetermined registration condition, when the coincidence rate which has been calculated by the coincidence rate calculating unit does not exceeds the allowable coincidence rate which has been designated by the allowable coincidence rate designating unit.

In addition, the paper sheet management apparatus recited in claim 11 according to claim 7 includes an information-to-be-searched inputting unit that inputs identification information to be searched; and a search control unit that searches an identification information recognition result approximate to the identification information to be searched which has been inputted by the information-to-be-searched inputting unit, from an identification information recognition result including the determined character and/or the undetermined character registered in the storage unit.

In addition, in the paper sheet management apparatus recited in claim 12 according to any one of claims 1 to 4, the identification information recognizing unit includes: a character recognizing unit that performs a character recognition on a plurality of pieces of identification information of the same contents from the paper sheet, and obtains character recognition results about the respective identification information including a recognizable character and/or an unrecognizable character; a comparing unit that compares the character recognition results of the respective identification information for each digit, which have been obtained by the character recognizing unit; a character determining unit that determines the determined character and/or the undetermined character by the characters of all the digits in the character recognition result having the smallest total number of the unrecognizable characters among the plurality of character recognition results which have been compared with each other by the comparing unit; and an identification information recognition result obtaining unit that obtains the identification information recognition result including the determined character and/or the undetermined character, after the characters of all the digits in the character recognition results have been determined by the character determining unit.

In addition, in order to achieve the aforementioned object, a paper sheet management method recited in claim 13 is a paper sheet management method including: performing a character recognition of identification information of predetermined digits for recognizing a paper sheet from the paper sheet, obtaining a character recognition result including a recognizable character and/or an unrecognizable character, and obtaining an identification information recognition result including a recognizable determined character and/or an unrecognizable undetermined character based on the obtained character recognition result; judging whether the identification information recognition result meets a predetermined registration condition or not, based on the determined character or the undetermined character in the obtained identification information recognition result; and registering the identification information recognition result in a storage unit when the identification information recognition result is judged to meet the predetermined registration condition, and forbidding registration of the identification information recognition result in the storage unit when the identification information recognition result is judged not to meet the predetermined registration condition.

In addition, in order to achieve the aforementioned object, a paper sheet management program recited in claim 14 is a paper sheet management program that causes a processing program to be executed by a computer device, the processing program including: performing a character recognition of identification information of predetermined digits for recognizing a paper sheet from the paper sheet, obtaining a character recognition result including a recognizable character and/or an unrecognizable character, and obtaining an identification information recognition result including a recognizable determined character and/or an unrecognizable undetermined character based on the obtained character recognition result; judging whether the identification information recognition result meets a predetermined registration condition or not, based on the determined character or the undetermined character in the obtained identification information recognition result; and registering the identification information recognition result in a storage unit when the identification information recognition result is judged to meet the predetermined registration condition, and forbidding registration of the identification information recognition result in the storage unit when the identification information recognition result is judged not to meet the predetermined registration condition.

Effect of the Invention

According to the paper sheet management apparatus recited in claim 1, based on the determined character or the undetermined character in the identification information recognition result, when the identification information recognition result meets the predetermined registration condition, the identification information recognition result is registered in the storage unit, and when the identification information recognition result does not meet the predetermined registration condition, registration of the identification information recognition result in the storage unit is forbidden. That is to say, when the identification information recognition result meets the predetermined registration condition, for example, when the identification information recognition result can be specified regardless of the presence of an undetermined character in the identification information recognition result, the identification information recognition result is registered in the storage unit. On the other hand, when the identification information recognition result does not meet the predetermined registration condition, for example, when the identification information recognition result cannot be specified, registration of the identification information recognition result in the storage unit is forbidden. As a result, in this paper sheet management apparatus, needless registration of the identification information recognition result that cannot be specified in the storage unit as it is can be avoided. In addition, even when an identification information recognition result includes an undetermined character, the identification information recognition result can be registered in the storage unit without any inputting operation, as long as the identification information recognition result can be specified. Thus, an operational burden on a user who inputs identification information can be remarkably reduced.

In addition, according to the paper sheet management apparatus recited in claim 2, the following effect can be obtained in addition to the effect of claim 1. When a character of the specific digit in the identification information recognition result, which has been designated by the specific digit designating unit, is the determined character, it is judged that the identification information recognition result meets the predetermined registration condition. On the other hand, when a character of the specific digit in the identification information recognition result is the undetermined character, it is judged that the identification information recognition result does not meet the predetermined registration condition. That is to say, when a character of the specific digit in the identification information recognition result is a determined character, the identification information recognition result is judged to be capable of being specified, and the identification information recognition result is registered in the storage unit. On the other hand, when a character of the specific digit is an undetermined character, the identification information recognition result is judged to be incapable of being specified, and registration of the identification information recognition result in the storage unit is forbidden. As a result, in this paper sheet management apparatus, even when the identification information recognition result includes an undetermined character, the identification information recognition result can be registered in the storage unit without any inputting operation, as long as the identification information recognition result meets the condition of the specific digit. Thus, an operational burden on a user who inputs identification information can be remarkably reduced.

In addition, according to the paper sheet management apparatus, a user can use the specific digit designating unit so as to freely designate, as a specific digit, a character required for recognizing identification information recognition result, such as a character representing a Mint or a digit describing a character used for checking digit. Thus, it is possible to cope with various paper sheets of different digits describing characters required for recognition sufficiently. Further, a registration condition range subject to a specific digit can be freely set.

In addition, according to the paper sheet management apparatus recited in claim 3, the following effect can be obtained in addition to the effect of claim 1. When the total number of the undetermined characters in the identification information recognition result is equal to or less than the allowable number of characters which has been designated by the unit for designating the allowable number of undetermined characters, the identification information recognition result is judged to meet the predetermined registration condition. On the other hand, when the total number of the undetermined characters in the identification information recognition result exceeds the allowable number of characters, the identification information recognition result is judged not to meet the predetermined registration condition. That is to say, when the total number of the undetermined characters in the identification information recognition result is equal to or less than the allowable number of characters, the identification information recognition result is judged to be capable of being specified, and the identification information recognition result is registered in the storage unit. On the other hand, when the total number of the undetermined characters in the identification information recognition result exceeds the allowable number of characters, the identification information recognition result is judged to be incapable of being specified, and registration of the identification information recognition result in the storage unit is forbidden. As a result, in this paper sheet management apparatus, even when the identification information recognition result includes an undetermined character, the identification information recognition result can be registered in the storage unit without any inputting operation, as long as the identification information recognition result meets the condition of the allowable number of characters. Thus, an operational burden on a user who inputs identification information can be remarkably reduced.

In addition, according to the paper sheet management apparatus, a user can use the unit for designating the allowable number of undetermined characters so as to freely designate the allowable number of undetermined characters for recognizing the identification information recognition result. Thus, it is possible to cope with various paper sheets of different number of digits sufficiently. Further, a registration condition range subject to the allowable number of undetermined characters can be freely set.

In addition, according to the paper sheet management apparatus recited in claim 4, the following effect can be obtained in addition to the effect of claim 1. When a character of the specific digit in the identification information recognition result, which has been designated by the specific digit designating unit, is the determined character, and when the total number of the undetermined characters in the identification information recognition result is equal to or less than the allowable number of undetermined characters which has been designated by the unit for designating the allowable number of undetermined characters, the identification information recognition result is judged to meet the predetermined registration condition. On the other hand, when a character of the specific digit in the identification information recognition result, which has been designated by the specific digit designating unit, is the undetermined character, or when the total number of the undetermined characters in the identification information recognition result exceeds the allowable number of undetermined characters which has been designated by the unit for designating the allowable number of undetermined characters, the identification information recognition result is judged not to meet the predetermined registration condition. As a result, in this paper sheet management apparatus, even when the identification information recognition result includes an undetermined character, the identification information recognition result can be registered in the storage unit without any inputting operation, as long as the identification information recognition result meets the conditions of the specific digit and the allowable number of characters. Thus, an operational burden on a user who inputs identification information can be remarkably reduced.

In addition, according to the paper sheet management apparatus, a user can use the specific digit designating unit and the unit for designating the allowable number of undetermined characters so as to freely designate the specific digit and the allowable number of characters in the identification information recognition result. Thus, it is possible to cope with various paper sheets sufficiently. Further, a registration condition range subject to the specific digit and the allowable number of characters can be freely set.

In addition, according to the paper sheet management apparatus recited in claim 5, the following effect can be obtained in addition to the effect of any one of claims 1 to 4. When the identification information recognition result does not meet the predetermined registration condition, an inputting operation for the identification information recognition result is demanded. When an inputting operation for inputting the identification information recognition result is detected, the identification information recognition result inputted by the inputting operation is registered in the storage unit. As a result, only when the identification information recognition result does not meet the predetermined registration condition, an inputting operation of the identification information recognition result is demanded. Thus, an operational burden on a user who inputs identification information can be remarkably reduced.

In addition, according to the paper sheet management apparatus recited in claim 6, the following effect can be obtained in addition to the effect of any one of claims 1 to 4. An identification information recognition result approximate to the identification information to be searched, which has been inputted by the information-to-be-searched inputting unit, is searched from the identification information recognition result including the determined character and/or the undetermined character registered in the storage unit. Thus, for example, an identification information recognition result approximate to the identification information to be searched can be easily searched from an identification information recognition result including an undetermined character.

In addition, according to the paper sheet management apparatus recited in claim 7, the following effect can be obtained in addition to the effect of any one of claims 1 to 4. When the paper sheet has a plurality of pieces of identification information of the same contents, character recognition results of these identification information are compared with each other. When all the characters of the corresponding digit in the character recognition results are the same recognizable characters, the character is determined as a determined character of the corresponding digit. When the characters of the corresponding digit in the character recognition results are different characters including at least one recognizable character, a given character among these different characters is determined as a determined character of the corresponding digit. When all the characters of the corresponding digit in the character recognition results are unrecognizable characters, the character of the corresponding digit is determined as an undetermined character. After the characters of all the digits in the character recognition results have been determined, an identification information recognition result including a determined character and/or an undetermined character is obtained. Thus, based on the comparison result among the plurality of character recognition results, the characters of all the digits in the identification information recognition result can be determined.

In addition, according to the paper sheet management apparatus recited in claim 8, the following effect can be obtained in addition to the effect of claim 7. When the characters of the corresponding digit in the character recognition results are different characters including at least one recognizable character, and a given character among these different characters is determined as a determined character of the corresponding digit, the character of the corresponding digit of the character recognition result having the smallest number of unrecognizable characters among the plurality of character recognition results, is determined as a determined character of the corresponding digit. Thus, the characters of the respective digits in the identification information recognition result can be easily determined.

In addition, according to the paper sheet management apparatus recited in claim 9, the following effect can be obtained in addition to the effect of claim 7. When the characters of the corresponding digit in the character recognition results are different characters including at least one recognizable character, and a given character among these different characters is determined as a determined character of the corresponding digit, the character of the corresponding digit of the character recognition result of a higher priority order stored in the priority order storage unit among the plurality of character recognition results, is determined as a determined character of the corresponding digit. Thus, the characters of the respective digits in the identification information recognition result can be easily determined.

In addition, according to the paper sheet management apparatus recited in claim 10, the following effect can be obtained in addition to the effect of claim 7. When the coincidence rate calculated by the coincidence rate calculating unit does not exceed the coincidence rate which has been designated by the allowable coincidence rate designating unit, the identification information recognition result is judged not to meet the predetermined registration condition. As a result, in this paper sheet management apparatus, when the coincidence rate does not exceed the allowable coincidence rate, it is judged that the coincidence rate between the determined characters of the corresponding digit in the character recognition results is low, and that a recognition reliability of the identification information recognition result is low. Thus, registration of the identification information recognition result in the storage unit is forbidden. Thus, problem caused by error recognition of the identification information recognition result can be avoided.

In addition, according to the paper sheet management apparatus recited in claim 11, the following effect can be obtained in addition to the effect of claim 7. An identification information recognition result approximate to the identification information to be searched, which has been inputted by the information-to-be-searched inputting unit, is searched from an identification information recognition result including the determined character and/or the undetermined character registered in the storage unit. Thus, for example, an identification information recognition result approximate to the identification information to be searched can be easily searched from an identification information recognition result including an undetermined character.

In addition, according to the paper sheet management apparatus recited in claim 12, the following operation can be obtained in addition to the effect of any one of claims 1 to 4. When the paper sheet has a plurality of pieces of identification information of the same contents, the determined character and/or the undetermined character are determined by the characters of all the digits in the character recognition result having the smallest total number of the unrecognizable characters among the plurality of character recognition results. After the characters of all the digits in the character recognition results have been determined, the identification information recognition result including the determined character and/or the undetermined character is obtained. Thus, process burden for determining characters of the respective digits in the identification information recognition result can be significantly reduced.

In addition, according to the paper sheet management method recited in claim 13, based on the determined character or the undetermined character in the identification information recognition result, when the identification information recognition result meets the predetermined registration condition, the identification information recognition result is registered in the storage unit, and when the identification information recognition result does not meet the predetermined registration condition, registration of the identification information recognition result in the storage unit is forbidden. That is to say, when the identification information recognition result meets the predetermined registration condition, for example, the identification information recognition result can be specified regardless of the presence of an undetermined character in the identification information recognition result, the identification information recognition result is registered in the storage unit. On the other hand, when the identification information recognition result does not meet the predetermined registration condition, for example, when the identification information recognition result cannot be specified, registration of the identification information recognition result in the storage unit is forbidden. As a result, in this paper sheet management method, needless registration of the identification information recognition result that cannot be specified in the storage unit as it is can be avoided. In addition, even when an identification information recognition result includes an undetermined character, the identification information recognition result can be registered in the storage unit without any inputting operation, as long as the identification information recognition result can be specified. Thus, an operational burden on a user who inputs identification information can be remarkably reduced.

In addition, according to the paper sheet management program recited in claim 14, based on the determined character or the undetermined character in the identification information recognition result, when the identification information recognition result meets the predetermined registration condition, the identification information recognition result is registered in the storage unit, and when the identification information recognition result does not meet the predetermined registration condition, registration of the identification information recognition result in the storage unit is forbidden. That is to say, when the identification information recognition result meets the predetermined registration condition, for example, the identification information recognition result can be specified regardless of the presence of an undetermined character in the identification information recognition result, the identification information recognition result is registered in the storage unit. On the other hand, when the identification information recognition result does not meet the predetermined registration condition, for example, when the identification information recognition result cannot be specified, registration of the identification information recognition result in the storage unit is forbidden. As a result, in this paper sheet management program, needless registration of the identification information recognition result that cannot be specified in the storage unit as it is can be avoided. In addition, even when an identification information recognition result includes an undetermined character, the identification information recognition result can be registered in the storage unit without any inputting operation, as long as the identification information recognition result can be specified. Thus, an operational burden on a user who inputs identification information can be remarkably reduced.

DESCRIPTION OF REFERENCE NUMBERS

Figure 1:
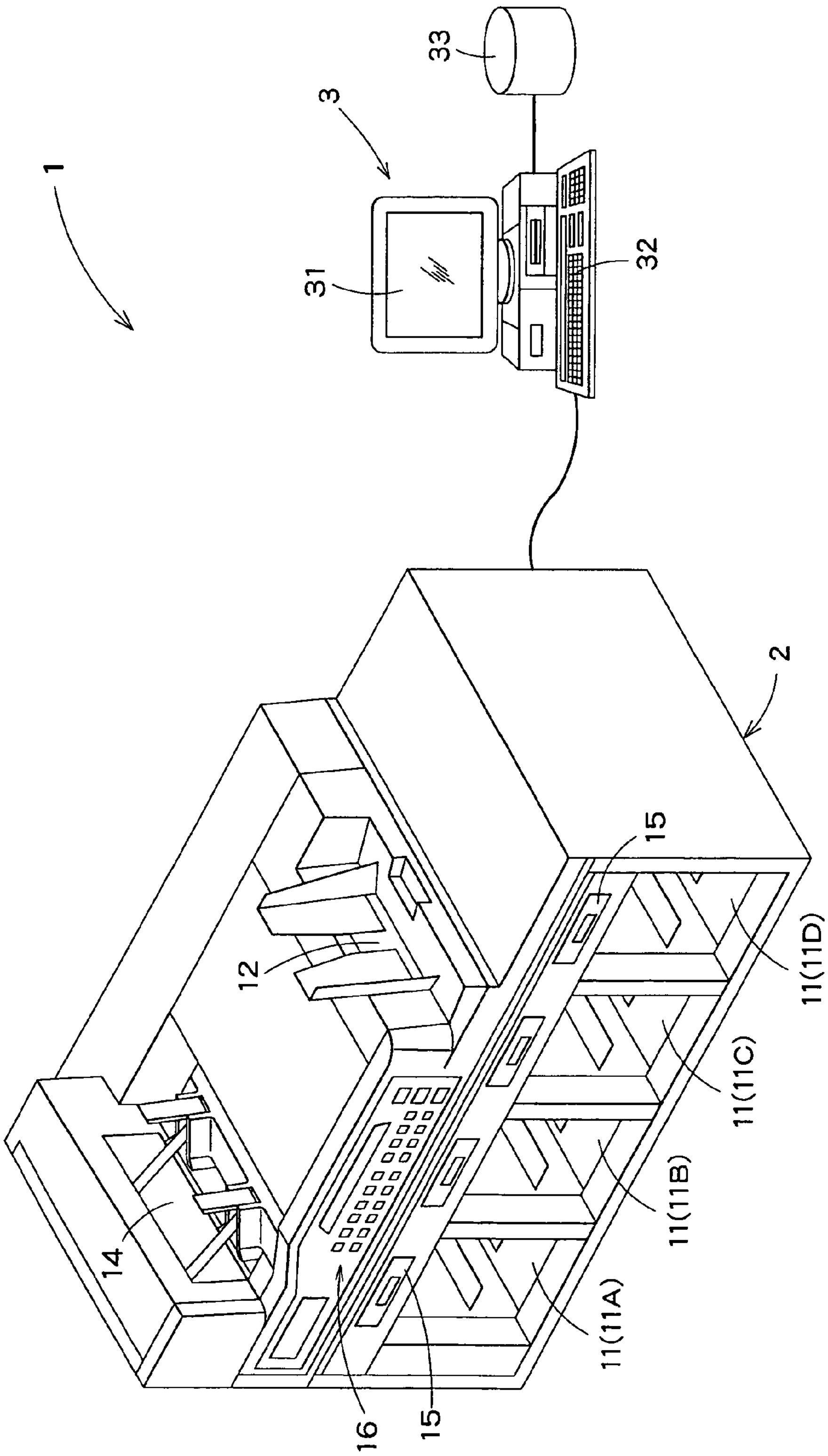
FIG. 1 is a system explanatory view showing a schematic structure of an overall banknote management system in one embodiment.

1 banknote management system
2 banknote handling apparatus
3 banknote management apparatus
32A specific digit designating unit
32B unit for designating the allowable number of error characters
32C coincidence rate designating unit
32D information-to-be-searched inputting unit database
38A serial number recognizing unit
38B serial number registration condition processing unit
38E DB control unit
38F search control unit
43 serial number character recognizing unit
44 serial number comparing unit
45 character determination unit
46 different number checking unit
47 serial number recognition result obtaining unit
61 specific digit judgment unit
62 unit for judging the allowable number of error characters
63 coincidence rate judgment unit
64 counterfeit note list judgment unit
65 serial number input demanding unit

BEST MODE FOR CARRYING OUT THE INVENTION

Herebelow, a banknote management system showing an embodiment in relation to a banknote management apparatus, a banknote management method and a banknote management program of the present invention will be described in detail with reference to the drawings.

At first, summary of the embodiment is described. A serial number (characters) of a banknote is firstly recognized, and a serial number recognition result is obtained from the character recognition result. Based on a determined character or an undetermined character (error character) in the serial number recognition result, when the serial number recognition result meets a predetermined registration condition, that is to say, when the serial number recognition result can be specified regardless of the presence of the undetermined character (error character), the serial number recognition result is registered in a database. On the other hand, when the serial number recognition result does not meet the predetermined registration condition, that is to say, the serial number recognition result cannot be specified, registration of the serial number recognition result in the database is forbidden.

As a result, in this embodiment, needless registration of a serial number recognition result, which cannot be specified, in the database is avoided, and even when a serial number recognition result includes an undetermined character (error character) but the serial number recognition result can be specified, the serial number recognition result is registered in the database without requiring any inputting operation. Thus, an operational burden on a user who inputs a serial number can be significantly reduced.

Figure 2:
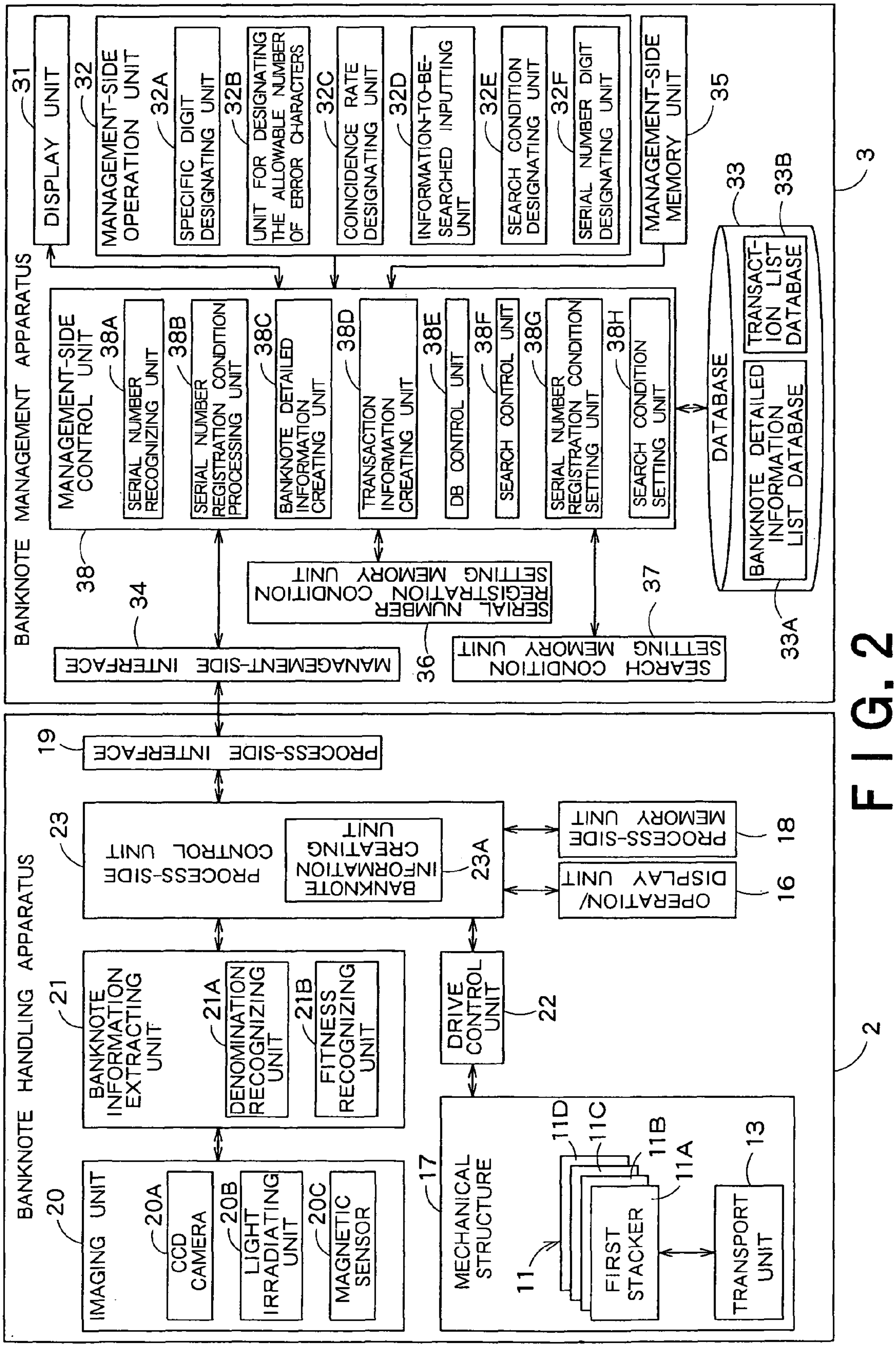
FIG. 2 is a block view showing a schematic structure of an inside of the banknote management system.

FIG. 1 is an explanatory view showing a schematic structure of an overall banknote management system in this embodiment. FIG. 2 is a block view showing a schematic structure of an inside of the banknote management system.

The banknote management system 1 shown in FIG. 1 includes a banknote handling apparatus 2 having a plurality of stackers 11 in which banknotes are stacked, and a banknote management apparatus 3 such as a personal computer that manages the banknote handling apparatus 2. In the banknote handling apparatus 2, banknotes are sorted based on sorting conditions set for the respective stackers 11, and the sorted banknotes are sequentially stacked in the plurality of stackers 11 corresponding to the sorting conditions.

The banknote handling apparatus 2 includes a banknote inlet unit 12 into which a banknote is put, a transport unit 13 (see, FIG. 2) that transports banknotes put from the banknote inlet unit 12 one by one, the plurality of stackers 11 in which the banknotes transported by the transport unit 13 are sequentially stacked, a reject unit 14 that rejects a banknote which does not fall under the sorting conditions of the stackers 11, stacker display units 15 that display states of the respective stackers 11, and an operation/display unit 16 by which various information is inputted or displayed.

The stackers 11 include a first stacker 11A, a second stacker 11B, a third stacker 11C and a fourth stacker 11D corresponding to respective conditions for sorting banknotes. The sorting conditions can be suitably changed depending on a designating operation from the banknote management apparatus 3.

When a banknote having been transported by the transport unit 13 falls under the sorting condition of the first stacker 11A, the banknote handling apparatus 2 sends the banknote to the first stacker 11A. When a banknote having been transported by the transport unit 13 falls under the sorting condition of the second stacker 11B, the banknote handling apparatus 2 sends the banknote to the second stacker 11B. When a banknote having been transported by the transport unit 13 falls under the sorting condition of the third stacker 11C, the banknote handling apparatus 2 sends the banknote to the third stacker 11C. When a banknote having been transported by the transport unit 13 falls under the sorting condition of the fourth stacker 11D, the banknote handling apparatus 2 sends the banknote to the fourth stacker 11D.

In addition, when a banknote having been transported by the transport unit 13 does not fall under any of the sorting conditions of the first stacker 11A, the second stacker 11B, the third stacker 11C and the fourth stacker 11D, the banknote handling apparatus 2 transports the banknote to the reject unit 14.

The banknote management apparatus 3 is connected to the banknote handling apparatus 2 so as to manage the banknote handling apparatus 2. The banknote management apparatus 3 includes a display unit 31 that displays various information, a management-side operation unit 32 by which various information is inputted, and a database 33 in which banknote detailed information of a banknote is registered and managed.

The banknote handling apparatus 2 shown in FIG. 2 includes: a mechanical machine 17 such as the stackers 11, the transport unit 13 and so on; the operation/display unit 16; a process-side memory unit 18 that stores various information; and a process-side interface 19 that serves as a communication interface between the banknote handling apparatus 2 and the banknote management apparatus 3.

Further, the banknote handling apparatus 2 includes an imaging unit 20 that images a banknote image of a face surface and a back surface of a banknote having been transported by the transport unit 13, a banknote information extracting unit 21 that extracts banknote information from the banknote image imaged by the imaging unit 20, a drive control unit 22 that controls the drive of the mechanical machine 17, and a process-side control unit 23 that controls the banknote handling apparatus 2 as a whole.

The imaging unit 20 includes: a light irradiating unit 20B that irradiates plural kinds of light beams, such as a visible light beam, an infrared light beam, a green light beam and so on, onto a banknote having been transported by the transport unit 13; and a CCD (Charge Coupled Device) camera 20A.

The imaging unit 20 sequentially irradiates plural kinds of light beams by the light irradiating unit 20B onto a banknote having been transported by the transport unit 13, and receives reflected lights reflected on the banknote by the CCD camera 20A, so as to image images of a face surface and a back surface of the banknote.

Further, the imaging unit 20 irradiates a light beam by the light irradiating unit 20B onto a banknote, and receives a transmitted light beam having transmitted through a face surface and a back surface of the banknote by the CCD camera 20A, so as to image a transmission image of the banknote.

Furthermore, the imaging unit 20 has a magnetic sensor 20C for detecting magnetic distributions of a face surface and a back surface of a banknote, and obtains a magnetic distribution of each banknote detected by the magnetic sensor 20C.

That is to say, the imaging unit 20 obtains, as banknote images, images of a face surface and a back surface of a banknote having been transported by the transport unit 13, a transmission image of the banknote, and a magnetic distribution of the banknote.

The banknote information extracting unit 21 includes a denomination recognizing unit 21A that recognizes a denomination of a banknote having been transported by the transport unit 13, and a fitness recognizing unit 21B that recognizes whether a banknote having been transported by the transport unit 13 is a fit note or an unfit note.

Based on the banknote image of the banknote obtained from the imaging unit 20, the denomination recognizing unit 21A recognizes, for example, in a case of Japanese banknotes, a denomination (whether the banknote is a 10,000-yen banknote, 5,000-yen banknote, 2,000-yen banknote, or a 1,000-yen banknote), and a version (whether the banknote is a new version banknote or an old version banknote based on a low of banknote issuance). In a case of foreign banknotes, the denomination recognizing unit 21A recognizes, in addition to a denomination, an edition number (generation of version) as a part of the denomination.

Based on the banknote image of the banknote obtained from the imaging unit 20, the fitness recognizing unit 21B recognizes a fitness result of the banknote, i.e., whether the banknote is a fit note corresponding to a banknote capable of being loaded into an ATM of a financial institute (hereinafter referred to simply as "ATM FIT note"), a fit note corresponding to a banknote capable of being used in a counter (hereinafter referred to simply as "TELLER FIT note") or an unfit note corresponding to a banknote unsuitable for circulation (hereinafter referred to as "UNFIT note"). As compared with a TELLER FIT note, an ATM FIT note corresponds to a banknote that is less limp and less stained, and thus can smoothly pass through an inside mechanism of the ATM.

The process-side control unit 23 includes a banknote information creating unit 23A that creates banknote information of a banknote.

The banknote information creating unit 23A creates, as banknote information, a banknote image from the imaging unit 20, a denomination result of the denomination recognizing unit 21A, a fitness result of the fitness recognizing unit 21B, and a transaction ID for recognizing a deal of the banknote.

In addition, the banknote management apparatus 3 includes a management-side interface 34 that serves as a communication interface between the banknote management apparatus 3 and the banknote handling apparatus 2, and a management-side memory unit 35 that stores various information, in addition to the display unit 31, the management-side operation unit 32 and the database 33.

Further, the banknote management apparatus 3 includes: a serial number registration condition setting memory unit 36 that sets and stores a serial number registration condition in use for registration of a serial number of a banknote in the database 33, which will be described below; a search condition setting memory unit 37 that sets and stores a search condition in use for search of banknote detailed information registered in the database 33 by a serial number, which will be described below; and a management-side control unit 38 that controls the banknote management apparatus 3 as a whole.

Figure 3:
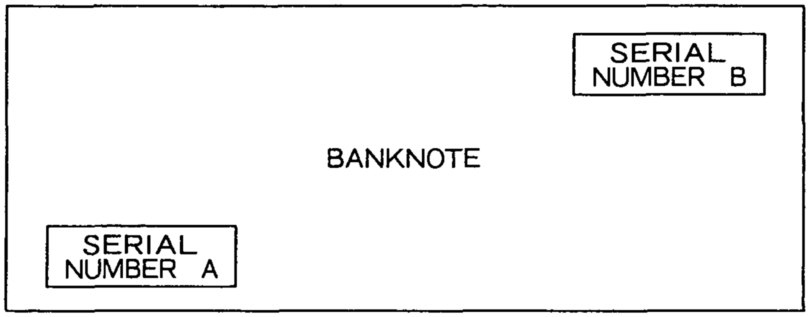
FIG. 3 is an explanatory view briefly showing a general positional relationship between serial numbers of a banknote.

FIG. 3 is an explanatory view briefly showing a positional relationship between serial numbers of a general banknote.

The banknote shown in FIG. 3 has a plurality of serial numbers of a predetermined plural number of digits for recognizing the banknote. For example, a serial number A is described on a lower left edge portion of the banknote, and a serial number B is described on an upper right edge portion thereof. The serial number A and the serial number B correspond to serial numbers of the same contents. A character indicating a Mint, which is required for recognition of the banknote, is assigned to a first digit of the predetermined plural digits of a serial number, for example.

The management-side control unit 38 of the banknote management apparatus 3 shown in FIG. 2 includes a serial number recognizing unit 38A and a serial number registration condition processing unit 38B. The serial number recognizing unit 38A obtains a character recognition result of each serial number based on a banknote image in banknote information that has been received from the banknote handling apparatus 2, and further obtains a serial number recognition result of the banknote from the obtained character recognition result of the serial number. The serial number registration condition processing unit 38B judges whether the serial number recognition result obtained by the serial number recognizing unit 38A meets a predetermined registration condition or not.

The serial number recognizing unit 38A extracts a serial number area of each serial number from the banknote image in the banknote information, and performs a character recognition of the serial number (characters) from the extracted serial number area, so as to obtain character recognition results of the serial number A and the serial number B, for example. Since the serial number A and the serial number B are serial numbers of the same contents, the serial number recognizing unit 38A normally obtains the same character recognition results. However, depending on a state of the banknote, the serial number recognizing unit 38A obtains a character recognition result of the serial number A and a character recognition result of the serial number B, which are different from each other.

Further, the serial number recognizing unit 38A compares the character recognition result of the serial number A and the character recognition result of the serial number B with each other, and obtains a serial number recognition result based on the comparison result. For example, suppose the following situation. Namely, a proper serial number is "1234567890", a character recognition result of the serial number A is "123456?890", and a character recognition result of the serial number B is "1?3?56?6?0". In this case, the serial number recognizing unit 38A compares the character recognition results of the serial number A and the serial number B with each other, and obtains a serial number recognition result of "123456?890". The character "?" in the character recognition result corresponds to a character that cannot be recognized, while the character "?" in the serial number recognition result corresponds to an error character that cannot be recognized.

When the serial number registration condition processing unit 38B obtains the serial number recognition result of the serial number recognizing unit 38A, the serial number registration condition processing unit 38B judges whether the serial number recognition result meets a predetermined registration condition or not. The predetermined registration condition includes: a first registration condition in which a character on a comparison-required specific digit of the plurality of digits of the serial number recognition result is a determined character; a second registration condition in which the total number of the error characters "?" of the serial number recognition result is equal to or less than the allowable number of error characters; a third registration condition in which a coincidence rate, which is a rate in which recognizable characters of the corresponding digit in the character recognition results of the serial number A and the serial number B coincide with each other, exceeds a comparison-required coincidence rate; and a fourth registration condition in which the serial number recognition result is not included in a counterfeit note list.

The comparison-required specific digit of the first registration condition corresponds to a digit of the plurality of digits of the serial number recognition result, which is required for recognizing the serial number, such as a digit describing a character indicating a Mint or a digit describing a character for use in a check digit. The comparison-required specific digit can be freely designated by a user who operates a specific digit designating unit 32A which is described below.

The allowable number of error characters of the second registration condition corresponds to the allowable number of error characters in the serial number recognition result. The allowable number of error characters can be freely designated by a user who operates a unit for designating the allowable number of error characters 32B which is described below.

The comparison-required coincidence rate of the third registration condition corresponds to a coincidence rate in which recognizable characters of the corresponding digit of the character recognition results coincide with each other, which is required for comparing the character recognition results of the serial number A and the serial number B with each other. The comparison-required coincidence rate can be freely designated by a user who operates a coincidence rate designating unit 32C which is described below.

The counterfeit note list of the fourth registration condition corresponds to serial numbers of counterfeit notes provided by a police agency and the like.

The banknote management apparatus 3 includes a banknote detailed information creating unit 38C and a transaction information creating unit 38D. When the serial number registration condition processing unit 38B judges that the serial number recognition result meets the predetermined registration condition, the banknote detailed information creating unit 38C creates banknote detailed information based on a serial number recognition result (or an inputted serial number) of the banknote and banknote information of the banknote. The transaction information creating unit 38D creates transaction information as to a deal of the banknote. The inputted serial number corresponds to a serial number that has been inputted by an inputting operation.

The banknote detailed information creating unit 38C creates banknote detailed information based on banknote information from the banknote handling apparatus 2 and a serial number recognition result (inputted serial number) of the serial number recognizing unit 38A. The banknote detailed information includes a banknote management number for recognizing the banknote, a serial number (a serial number recognition result or an inputted serial number) of the banknote, a denomination result of the banknote, an edition number of the banknote, a fitness result of the banknote, a sorting condition of the stacker 11 in which the banknote is sorted, a transaction ID of the banknote, and a banknote image of the banknote.

The transaction information creating unit 38D creates transaction information as contents of a transaction ID in the banknote detailed information created by the banknote detailed information creating unit 38C. The transaction information includes a transaction ID of the banknote, a transaction start date and time of the banknote, a transaction finish date and time of the banknote, a user ID for recognizing a dealer of the banknote, a customer ID for recognizing a transactional person of the banknote, a counter/ATM number for recognizing a counter or an ATM in which the banknote was dealt, and a branch code for recognizing a branch in which the banknote was dealt.

The database 33 includes a banknote detailed information list database 33A in which banknote detailed information is registered, and a transaction list database 33B in which transaction information is registered.

The management-side operation unit 32 of the banknote management apparatus 3 includes: the specific digit designating unit 32A that designates a comparison-required specific digit of a serial number recognition result, which is the first registration condition; the unit for designating the allowable number of error characters 32B that designates the allowable number of error characters in the serial number recognition result, which is the second registration condition; a coincidence rate designating unit 32C that designates a comparison-required coincidence rate, which is the third registration condition; an information-to-be-searched inputting unit 32D that inputs a serial number to be searched; a search condition designating unit 32E that designates a search condition; and a serial number digit designating unit 32F that designates the number of digits of a serial number.

Figure 4:
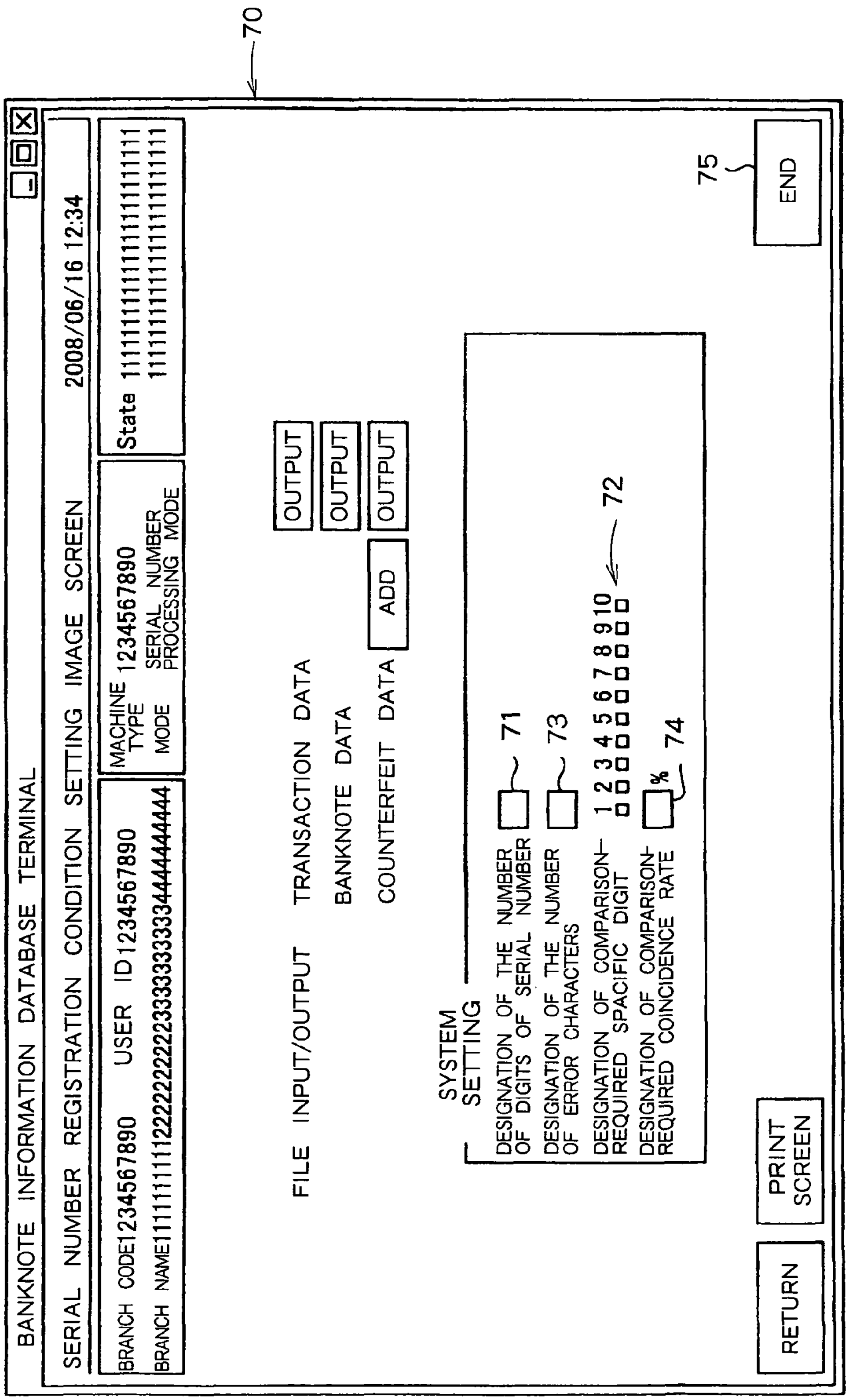
FIG. 4 is an explanatory view briefly showing a serial number registration condition setting image screen displayed on a display unit of a banknote management apparatus.

FIG. 4 is an explanatory view briefly showing a serial number registration condition setting image screen displayed on the display unit 31 of the banknote management apparatus 3.

A serial number registration condition setting image screen 70 shown in FIG. 4 includes: an input field 71 in which the number of digits of a serial number is designated and inputted by the serial number digit designating unit 32F; a checkbox designating field 72 in which the comparison-required number of digits is designated by the specific digit designating unit 32A; an input field 73 in which the allowable number of error characters is designated and inputted by the unit for designating the allowable number of error characters 32B; an input field 74 in which the comparison-required coincidence rate is designated and inputted by the coincidence rate designating unit 32C; and a finish button 75 that finishes a serial number registration condition setting operation.

When a designating and inputting operation by the serial number digit designating unit 32F for the number of digits of a serial number of a banknote to the input field 71 on the serial number registration condition setting image screen 70 is detected, the serial number registration condition setting unit 38G in the management-side control unit 38 displays the checkbox designating fields 72 corresponding to the number of digits of the serial number, on the serial number registration condition setting image screen 70. When the number of digits of the serial number is designated to be fifteen, fifteen checkbox designating fields 72 are displayed on the screen.

The specific digit designating unit 32A designates, as a comparison-required specific digit(s), one or a plurality of optional digits of the plurality of digits of the serial number by checking the checkbox designating field(s) 72 corresponding to the digit of the serial number.

The search condition designating unit 32E designates, as a first search condition, the allowable number of search error characters of a serial number of the banknote detailed information registered in the database 33. The search condition designating unit 32E designates, as a second search condition, the number of approximate digits at which a determined character(s) of the serial number of the banknote detailed information registered in the database 33 can be replaced with an approximate character(s). The search condition designating unit 32E designates, as a third search condition, a search-required specific digit of the serial number of the banknote detailed information registered in the database 33.

The number of search error characters of the first search condition corresponds to a search condition for searching only serial numbers having an error character(s) whose number is equal to or less than the number of error characters, among serial numbers (serial number recognition results or inputted serial numbers) of banknote detailed information registered in the database 33. For example, when the number of search error characters is "one", the search control unit 38F searches only banknote detailed information about serial numbers having one or less error character, which are registered in the database 33.

The number of approximate digits of the second search condition corresponds to the allowable number of digits at which a determined character whose digit is other than a comparison-required specific digit can be replaced with an approximate character among determined characters of serial numbers registered in the database 33, when a serial number approximate to the serial number to be searched from serial numbers of banknote detailed information registered in the database 33.

For example, when a serial number to be searched is "5555 . . . ", the number of approximate digit is "1", approximate characters to the determined character "5" are "S" and "6", and a comparison-required specific digit is the first digit, the search control unit 38F searches, from serial number recognition results of banknote detailed information registered in the database 33, "5S55 . . . ", "55S5 . . . ", "555S . . . ", "5655 . . . ", "5565 . . . " and so on which are approximate to the serial number "5555 . . . " to be searched.

The search-required specific digit of the third search condition corresponds to a search condition for searching only a serial number whose search-required specific digit is a determined character, among serial numbers of banknote detailed information registered in the database 33. When the search-required specific digit is the third digit, for example, the search control unit 38F searches only banknote detailed information about a serial number whose third digit is a determined character, which is registered in the database 33.

In addition, the management-side control unit 38 includes a database control unit (hereinafter referred to simply as "DB control unit") 38E that controls registration of data in the database 33, and a search control unit 38F that searches, from the database 33, banknote detailed information about a serial number to be searched which has been inputted by the information-to-be-searched inputting unit 32D.

The DB control unit 38E registers banknote detailed information of a banknote and transaction information thereof in the database 33.

Based on a search condition designated by the search condition designating unit 32E, the search control unit 38F searches, from the database 33, banknote detailed information about a serial number to be searched which has been inputted by the information-to-be-searched inputting unit 32D, and displays the search result on the screen of the display unit 31. The management-side control unit 38 can printout the search result.

In addition, the management-side control unit 38 includes a serial number registration condition setting unit 38G that sets a serial number registration condition designated by the management-side control unit 32, and a search condition setting unit 38H that sets a search condition designated by the search condition designating unit 32E.

The serial number registration condition setting unit 38G sets, in the serial number registration condition setting memory unit 36, a comparison-required specific digit in a serial number recognition result, which corresponds to the first registration condition, the comparison-required specific digit having been designated by the specific digit designating unit 32A; the allowable number of error characters in the serial number recognition result, which corresponds to the second registration condition, the allowable number of error characters having been designated by the unit for designating the allowable number of error characters 32B; and a comparison-required coincidence rate which corresponds to the third registration condition, the comparison-required coincidence rate having been designated by the coincidence rate designating unit 32C.

The search condition setting unit 38H sets, in the search condition setting memory unit 37, the number of search error characters corresponding to the first search condition, which has been designated by the search condition designating unit 32E; the number of approximate digits corresponding to the second search condition, which has been designated by the search condition designating unit 32E; and a search-required specific digit corresponding to the third search condition, which has been designated by the search condition designating unit 32E.

Figure 5:
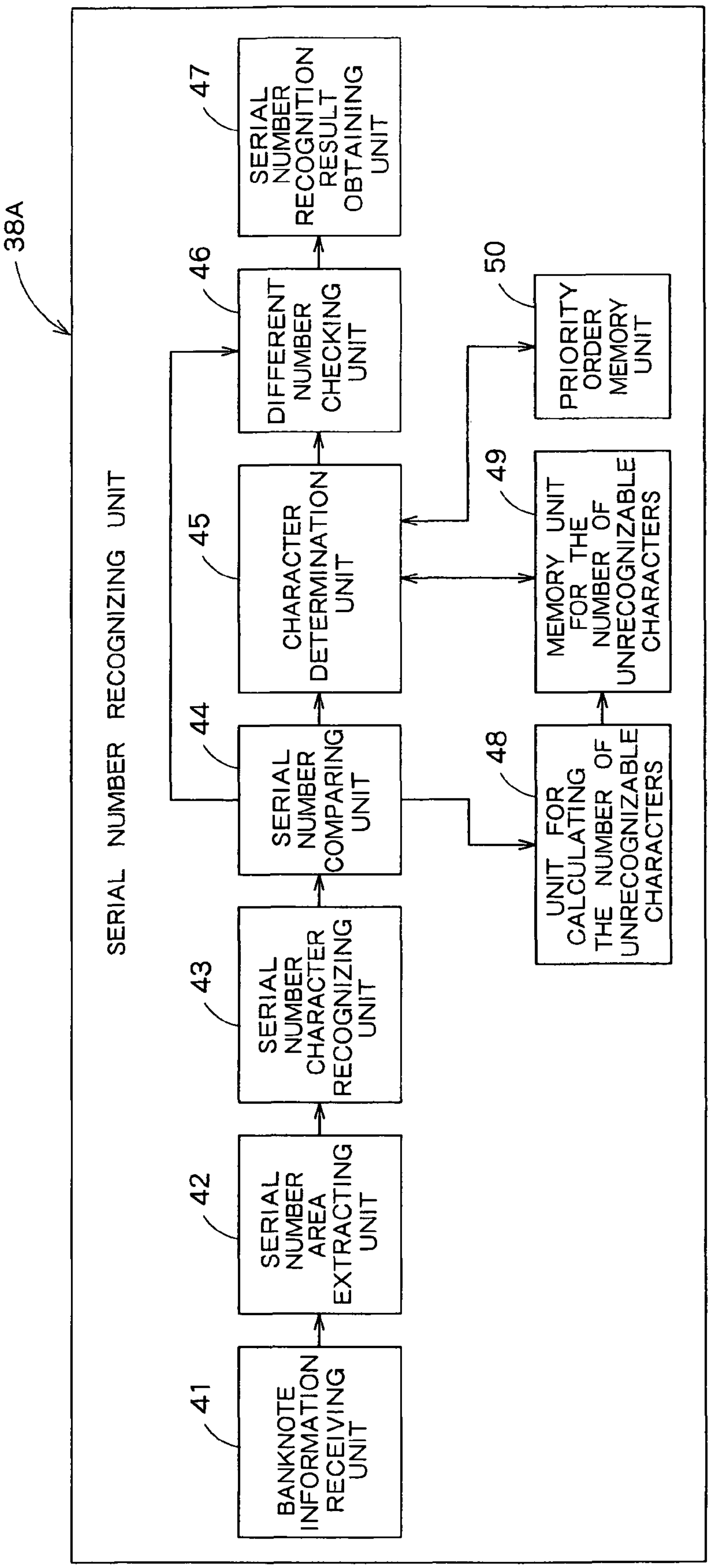
FIG. 5 is a block view showing a schematic structure of an inside of a serial number recognizing unit of a management-side control unit of the banknote management apparatus.

FIG. 5 is a block view showing a schematic structure of an inside of the serial number recognizing unit 38A of the management-side control unit 38 of the banknote management apparatus 3.

The serial number recognizing unit 38A shown in FIG. 5 includes: a banknote information receiving unit 41 that receives banknote information from the banknote handling apparatus 2 via the management-side interface 34; and a serial number area extracting unit 42 that extracts, e.g., two serial number areas of the serial number A and the serial number B on the banknote, from a banknote image received by the banknote information receiving unit 41.

The serial number recognizing unit 38A includes: a serial number character recognizing unit 43 that recognizes the serial number A and the serial number B from the serial number areas extracted by the serial number area extracting unit 42; and a serial number comparing unit 44 that compares the character recognition results of the serial number A and the serial number B recognized by the serial number character recognizing unit 43.

The serial number character recognizing unit 43 recognizes a serial number for each digit from the serial number area. When the character recognition could be performed, a recognizable character is recognized as a character of the corresponding digit. When the character recognition could not be performed, a character "?" indicating an unrecognizable character is recognized as a character of the corresponding digit.

The serial number character recognizing unit 43 obtains recognition results of characters of all the digits of the serial number A and the serial number B. In the example shown in FIG. 12, the serial number character recognizing unit 43 obtains "123?56?890" which is a character recognition result of the serial number A and "1?3?5676?0" which is a character recognition result of the serial number B.

The serial number comparing unit 44 compares and compares the character recognition result of the serial number A and the character recognition result of the serial number B for each digit.

The serial number recognizing unit 38A includes: a character determining unit 45 that compares the character recognition results of the serial number comparing unit 44 for each digit and determines characters of the respective digits of the serial numbers based on the comparison result; a different number checking unit 46 that performs a different number checking process based on the character recognition results of the serial number A and the serial number B; and a serial number recognition result obtaining unit 47 that obtains a serial number recognition result in which the characters of all the digits are determined by the character determining unit 45.

When the comparison result of the character recognition results of the serial number A and the serial number B for each digit by the serial number comparing unit 44 shows that all the characters of the corresponding digit are the same recognizable character, the character determining unit 45 determines the characters of the corresponding digit as the determined character of the corresponding digit. When the character of the third digit in the serial number A is "3" and the character of the third digit in the serial number B is "3", i.e., when all the characters of the corresponding digit are the same recognizable character, the character unit 45 determines the character of the third digit in the serial number recognition result as a determined character "3".

When all the characters of the corresponding digit are unrecognizable characters, the character determining unit 45 determines the characters of the corresponding digit as the error character "?". When the character of the fourth digit in the serial number A is "?" and the character of the fourth digit in the serial number B is "?", namely, when all the characters of the corresponding digit are unrecognizable characters, the character determining unit 45 determines the character of the fourth digit in the serial number recognition result as the error character "?".

When the characters of the corresponding digit include a recognizable character and an unrecognizable character, the character determining unit 45 determines a given character among recognizable characters as a determined character of the corresponding digit. When the character of the seventh digit in the serial number A is "?" and the character of the seventh digit in the serial number B is "7", the character determining unit determines the character of the seventh digit in the serial number recognition result as a determined character "7".

When the characters of the corresponding digit are different recognizable characters, the character determining unit 45 determines a given character among the different characters as a determined character of the corresponding digit. When the character of the eighth digit in the serial number A is "8" and the character of the eighth digit in the serial number B is "6", the character determining unit 45 determines the character of the eighth digit in the serial number recognition result as a determined character "8", based on a selecting and determining condition described below.

The serial number recognition result obtaining unit 47 obtains a serial number recognition result, by sequentially determining characters of all the digit by means of the character determining unit 45 based on the character recognition results of the serial number A and the serial number B.

The serial number recognizing unit 38A includes: a unit for calculating the number of unrecognizable characters 48 that calculates the number of unrecognizable characters of the respective character recognition results; a memory unit for the number of unrecognizable characters 49 that stores the number of unrecognizable characters of the serial number A and the serial number B which have been calculated by the unit for calculating the number of unrecognizable characters 48; and a priority order memory unit 50 that stores a priority order of the respective serial numbers.

Figure 12:
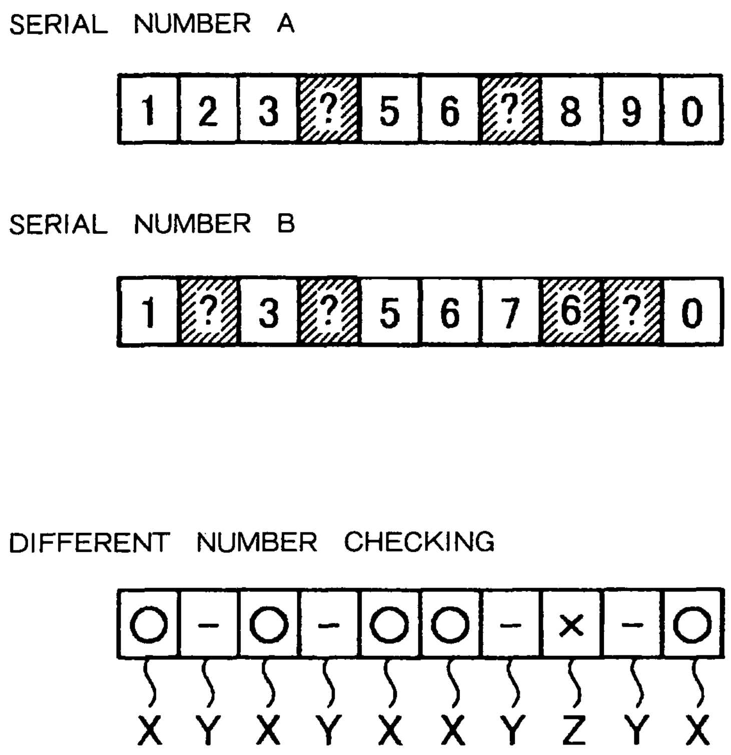
FIG. 12 is an explanatory view briefly showing a processing operation in relation to the serial number recognition process of the banknote management apparatus.

In the example shown in FIG. 12, the unit for calculating the number of unrecognizable characters 48 calculates that the number of unrecognizable characters in the character recognition result of the serial number A is two, and the number of unrecognizable characters in the character recognition result of the serial number B is three.

The priority order memory unit 50 sets a priority order of the serial numbers of the same contents on the banknote. For example, the priority order memory unit 50 sets that the priority order of the serial number A is high, and that the priority order of the serial number B is low. The priority order is set by a designating operation of the user.

Next, there is described the selecting and determining condition based on which, when different recognizable characters of the corresponding digit are determined by the character determining unit 45, a given character among the characters of the corresponding digit is selected and determined.

When the comparison result by the serial number comparing unit 44 shows that the characters of the corresponding digit of the respective character recognition results are different recognizable characters, the character determining unit 45 determines the character of the corresponding digit in the character recognition result of the serial number having the smallest number of unrecognizable characters, as a determined character of the corresponding digit, based on the number of unrecognizable characters stored in the memory unit for the number of unrecognizable characters 49. That is to say, when the character of the eighth digit in the serial number A is "8" and the character of the eighth digit in the serial number B is "6", the character determining unit 45 refers to the number of unrecognizable characters stored in the memory unit for the number of unrecognizable characters 49. Since the number of the unrecognizable characters of the character recognition result of the serial number A is the smallest, the character determining unit 45 determines the character "8" of the eighth digit in the character recognition result of the serial number A, as a determined character.

When the comparison result by the serial number comparing unit 44 shows that the characters of the corresponding digit of the respective character recognition results are different recognizable characters, and the numbers of the unrecognizable characters in the respective character recognition results stored in the memory unit for the unrecognizable characters 49 are the same with each other, the character determining unit 45 determines the character of the corresponding digit of the serial number whose priority order is higher stored in the priority order memory unit 50, as a determined character of the corresponding digit. Namely, in this case, since the priority order of the serial number A stored in the priority order memory unit 50 is higher, the character determining unit 45 determines the character of the corresponding digit in the character recognition result of the serial number A, as a determined character.

Figure 6:
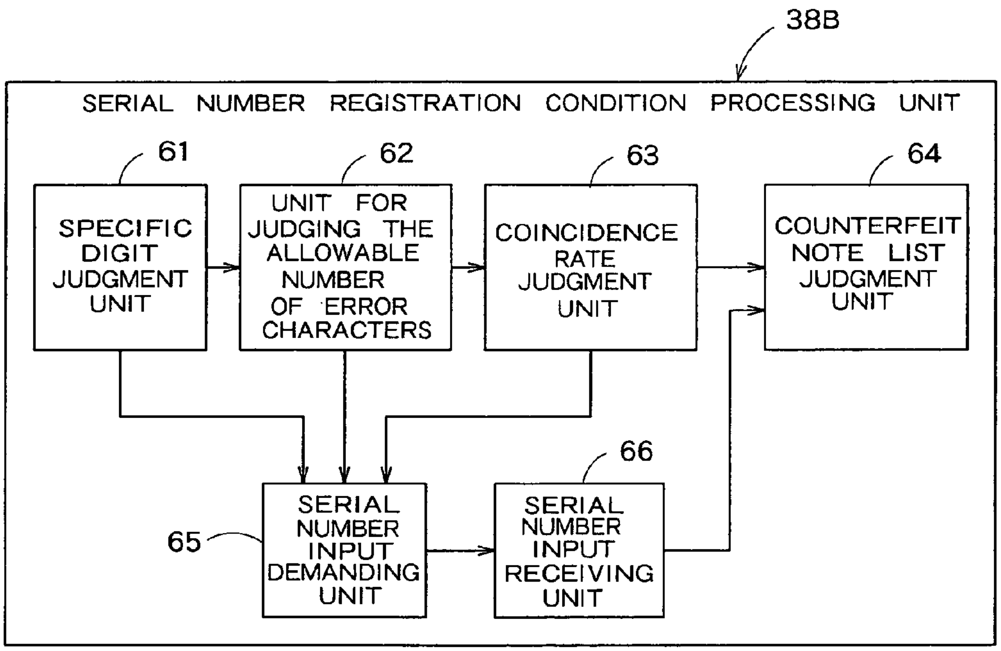
FIG. 6 is a block view showing a schematic structure of an inside of a serial number registration condition processing unit of the management-side control unit of the banknote management apparatus.

FIG. 6 is a block view showing a schematic structure of an inside of the serial number registration condition processing unit 38B of the management-side control unit 38 of the banknote management apparatus 3.

The serial number registration condition processing unit 38B shown in FIG. 6 includes: a specific digit judgment unit 61 that judges, when the specific digit judgment unit 61 obtains a serial number recognition result from the serial number recognizing unit 38A, whether a comparison-required specific digit of the serial number recognition result is a determined character or not; and a unit for judging the allowable number of error characters 62 that judges, when the comparison-required specific digit of the serial number recognition result is judged as a determined character by the specific digit judgment unit 61, whether or not the number of error characters in the serial number recognition result is equal to or less than the allowable number of error characters.

When the specific digit judgment unit 61 obtains a serial number recognition result from the serial number recognition result obtaining unit 47 in the serial number recognizing unit 38A, the specific digit judgment unit 61 judges whether a character of the comparison-required specific digit in the serial number recognition result, which is designated by the specific digit designating unit 32A, is a determined character or not. For example, when the first digit and the tenth digit in the serial number recognition result are designated as the comparison-required specific digits, and the character of the first digit is "1" and the character of the tenth digit is "0", the specific digit judgment unit 61 judges that the characters of the comparison-required specific digits are determined characters. Alternatively, for example, when the character of the first digit is "1" and the character of the tenth digit is "?", the specific digit judgment unit 61 judges that the character of the tenth digit which is the comparison-required specific digit is not a determined character.

When a character of the comparison-required specific digit in the serial number recognition result is judged as a determined character by the specific digit judgment unit 61, the unit for judging the allowable number of error characters 62 judges whether or not the number of error characters in the serial number recognition result is equal to or less than the number of error characters in the serial number recognition result, which has been designated by the unit for designating the allowable number of error characters 32B.

The serial number registration condition processing unit 38B includes a coincidence rate judgment unit 63 that judges, when the number of error characters in the serial number recognition result is judged to be equal to or less than the allowable number of error characters by the unit for judging the allowable number of error characters 62, whether or not the coincidence rate between the character recognition results of the serial number A and the serial number B exceeds a comparison-required coincidence rate designated by the coincidence rate designating unit 32C.

A coincidence rate is calculated by a rate in which recognizable characters of the corresponding digits in the character recognition results of the serial number A and the serial number B coincide with each other. For example, when a character recognition result of the serial number A is "123456?890" and a character recognition result of the serial number B is "1?3?5676?0", the coincidence rate judgment unit 63 checks five (X) digits of the first, third, fifth and tenth digits as digits including the same recognizable characters, the four (Y) digits of the second, fourth, seventh, and ninth digits as digits including unrecognizable characters, and one (Z) digit of the eighth digit including different recognizable characters. Based on the check result, the coincidence rate judgment unit calculates a coincidence rate based on the expression X/(X+Z).

The serial number registration condition processing unit 38B includes a counterfeit note list judgment unit 64 that judges, when the coincidence rate judgment unit 63 judges that the coincidence rate exceeds the comparison-required coincidence rate, whether or not the serial number recognition result (or inputted serial number) falls under serial numbers of counterfeit notes in the counterfeit note list.

When the serial number recognition result (or inputted serial number) does not fall under any of the serial numbers of counterfeit notes in the counterfeit note list, the counterfeit note list judgment unit 64 judges that the serial number recognition result (or inputted serial number) meets all the predetermined registration conditions (first to fourth registration conditions), and transmits the serial number recognition result (or inputted serial number) to the banknote detailed information creating unit 38C.

In addition to a case in which all the digit are determined characters, the serial number recognition result may include an error character "?" when a comparison-required specific digit in the serial number recognition result is a determined character, the number of error characters in the serial number recognition result is equal to or less than the allowable number of error characters, a coincidence rate between the character recognition results exceeds the comparison-required coincidence rate, and the serial number recognition result does not fall under any of the serial numbers of counterfeit note in the counterfeit note list, because the serial number meets the predetermined registration conditions.

Based on a serial number recognition result (or inputted serial number) of a banknote and banknote information, the banknote detailed information creating unit 38C creates banknote detailed information, and registers the banknote detailed information in the database 33 through the DB control unit 38E.

When the serial number recognition result of a banknote is judged to fall under any of the serial numbers of counterfeit notes in the counterfeit note list by the counterfeit note list judgment unit 64, the management-side control unit 38 forbids registration of the banknote detailed information about the banknote in the database 33, and displays an alarm of detection of a counterfeit note on the display unit 31 and the operation/display unit 16. Based on the alarm display, the user can recognize the detection of the counterfeit note.

The serial number registration condition processing unit 38B includes a serial number input demanding unit 65 and a serial number input receiving unit 66 that receives an inputted serial number corresponding to an inputting operation of the serial number. The serial number input demanding unit 65 does not transmit the serial number recognition result from the serial number recognizing unit 38A to the banknote detailed information creating unit 38C and demands an inputting operation of the serial number, when the specific digit judgment unit 61 judges that the comparison-required specific digit in the registration recognition result is not a determined character, or when the number of error characters in the serial number recognition result is equal to or less than the allowable number of error characters designated by the unit for designating the allowable number of error characters 62, or when the coincidence rate judgment unit 63 judges that the coincidence rate does not exceed the comparison-required coincidence rate, or when the counterfeit note list judgment unit 64 judges that the serial number recognition result falls under any of the serial numbers of counterfeit notes in the counterfeit note list.

The serial number input demanding unit 65 displays, on the screen of the display unit 31, a serial number input image for demanding an inputting operation of a serial number.

Figure 7:
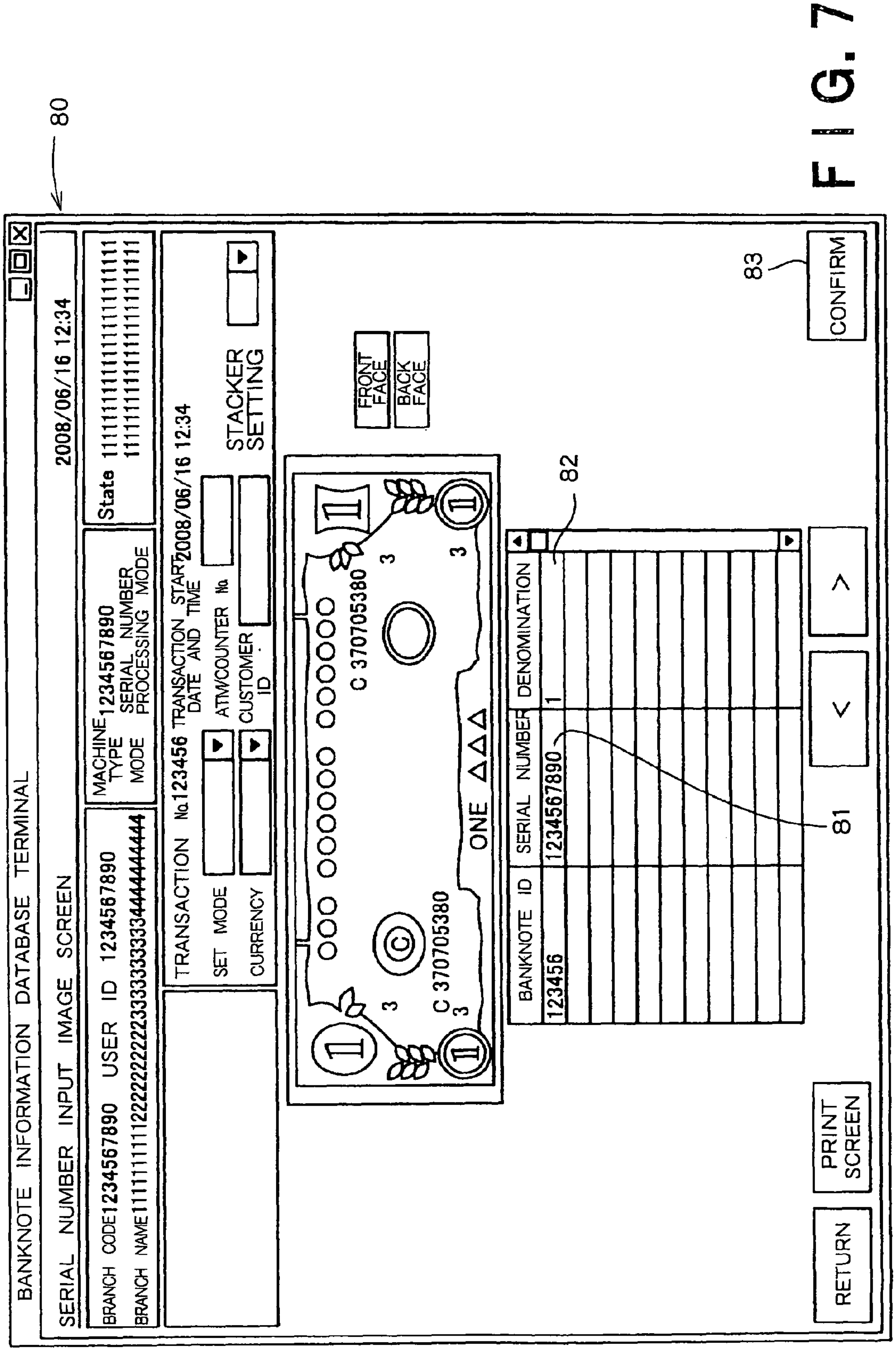
FIG. 7 is an explanatory view briefly showing a serial number input image screen displayed on the display unit of the banknote management apparatus.

FIG. 7 is an explanatory view briefly showing a serial number input image screen displayed on the display unit 31 of the banknote management apparatus 3.

The serial number input image screen 80 shown in FIG. 7 includes: a serial number input field 81 to which a serial number of a banknote corresponding to a banknote management number (banknote ID) is inputted by an inputting operation of a user; a denomination input field 82 to which a denomination result of the banknote is inputted, and a determination button 83 for determining the serial number of the banknote inputted to the serial number input field 81.

The serial number input receiving unit 66 receives the serial number of the banknote inputted to the serial number input field 81 on the serial number input screen 80. Then, the counterfeit note list judgment unit 64 judges whether or not the inputted serial number of the banknote falls under any of the serial numbers of counterfeit banknotes in the counterfeit banknote list.

When the counterfeit note list judgment unit 64 judges that the inputted serial number does not fall under any of the serial numbers of the counterfeit note list, the banknote detailed information creating unit 38C creates banknote detailed information based on the inputted serial number and the banknote information.

The search control unit 38F searches the serial number from the banknote detailed information registered in the database 33. Based on a search condition set by the search condition setting unit 38H, the search control unit 38F searches, from the database 33, banknote detailed information about serial numbers (or serial number recognition result) approximate to the serial number, and displays and outputs the search result as a serial number search image screen.

Figure 8:
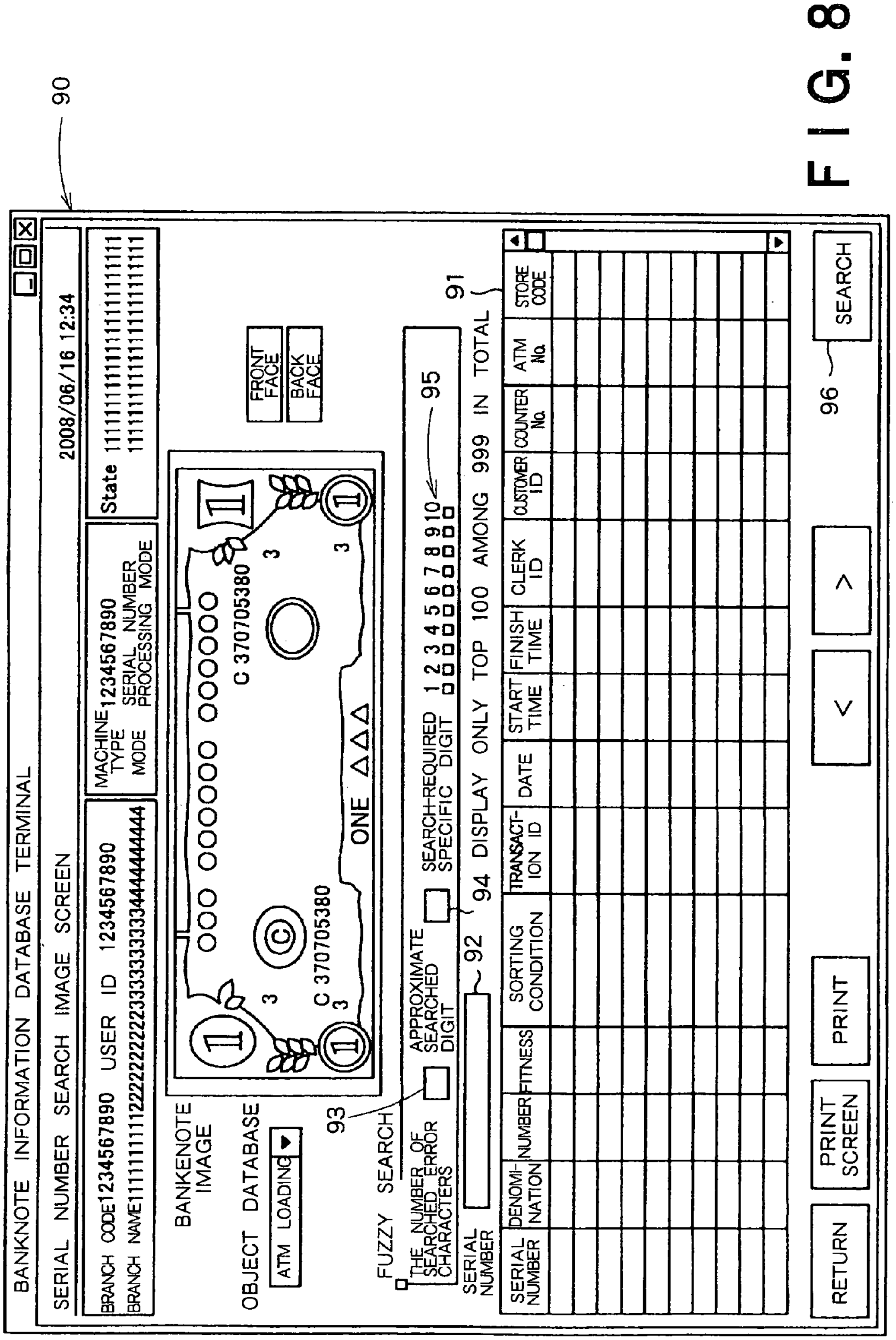
FIG. 8 is an explanatory view briefly showing a serial number search image screen displayed on the display unit of the banknote management apparatus.

FIG. 8 is an explanatory view briefly showing the serial number search image screen displayed on the display unit 31 of the banknote management apparatus 3.

The serial number search image screen 90 shown in FIG. 8 includes a list display field 91. The list display field 91 shows, as banknote detailed information of the search result, for example, a serial number of the banknote, a denomination result, an edition number, a fitness result, a sorting condition, a transaction ID and a banknote image. In addition, the list display field 91 shows, as contents of transaction information of the transaction ID, a transaction start date and time, a transaction finish date and time, a user UD (clerk ID), a customer ID, a counter/ATM number and a branch code In addition, the serial number search image screen 90 includes a serial number input field 92 of the information-to-be-searched inputting unit 32D to which a serial number to be searched is inputted. The serial number search image screen 90 further includes: a designating field 93 to which the number of searched error characters of the first search condition is designated and inputted; a designating field 94 to which the number of approximate digits of the second search condition is inputted, checkbox designating fields 95 that designate a search-required specific digit(s) of the third search condition; and a search button 96 for starting a search; which constitute the search condition designating unit 32E that designates search conditions for searching banknote detailed information about serial number recognition results including a error character registered in the database 33.

The paper sheet management apparatus described in the claims corresponds to the banknote management apparatus 3. The paper sheet corresponds to the banknote. The identification information corresponds to the serial number. The identification information recognizing unit corresponds to the serial number recognizing unit 38A. The registration condition judgment unit corresponds to the serial number registration condition processing unit 38B, the specific digit judgment unit 61, the unit for judging the allowable number of error characters 62, the coincidence rate judgment unit 63, and the counterfeit note list judgment unit 64. The storage unit corresponds to the database 33. The registration control unit corresponds to the DB control unit 38E. The specific digit designating unit corresponds to the specific digit designating unit 32A. The unit for designating the allowable number of undetermined characters corresponds to the unit for designating the allowable number of error characters 32B. The allowable number of undetermined characters corresponds to the allowable number of error characters. The inputting operation demanding unit corresponds to the serial number input demanding unit 65. The information-to-be-searched inputting unit corresponds to the information-to-be-searched inputting unit 32D. The search control unit corresponds to the search control unit 38F. The character recognizing unit corresponds to the serial number character recognizing unit 43. The comparing unit corresponds to the serial number comparing unit 44. The character determining unit corresponds to the character determining unit 45. The identification information recognizing and obtaining unit corresponds to the serial number recognition result obtaining unit 47. The coincidence rate calculating unit corresponds to the different number checking unit 46. The allowable coincidence rate designating unit corresponds to the coincidence rate designating unit 32C.

Figure 9:
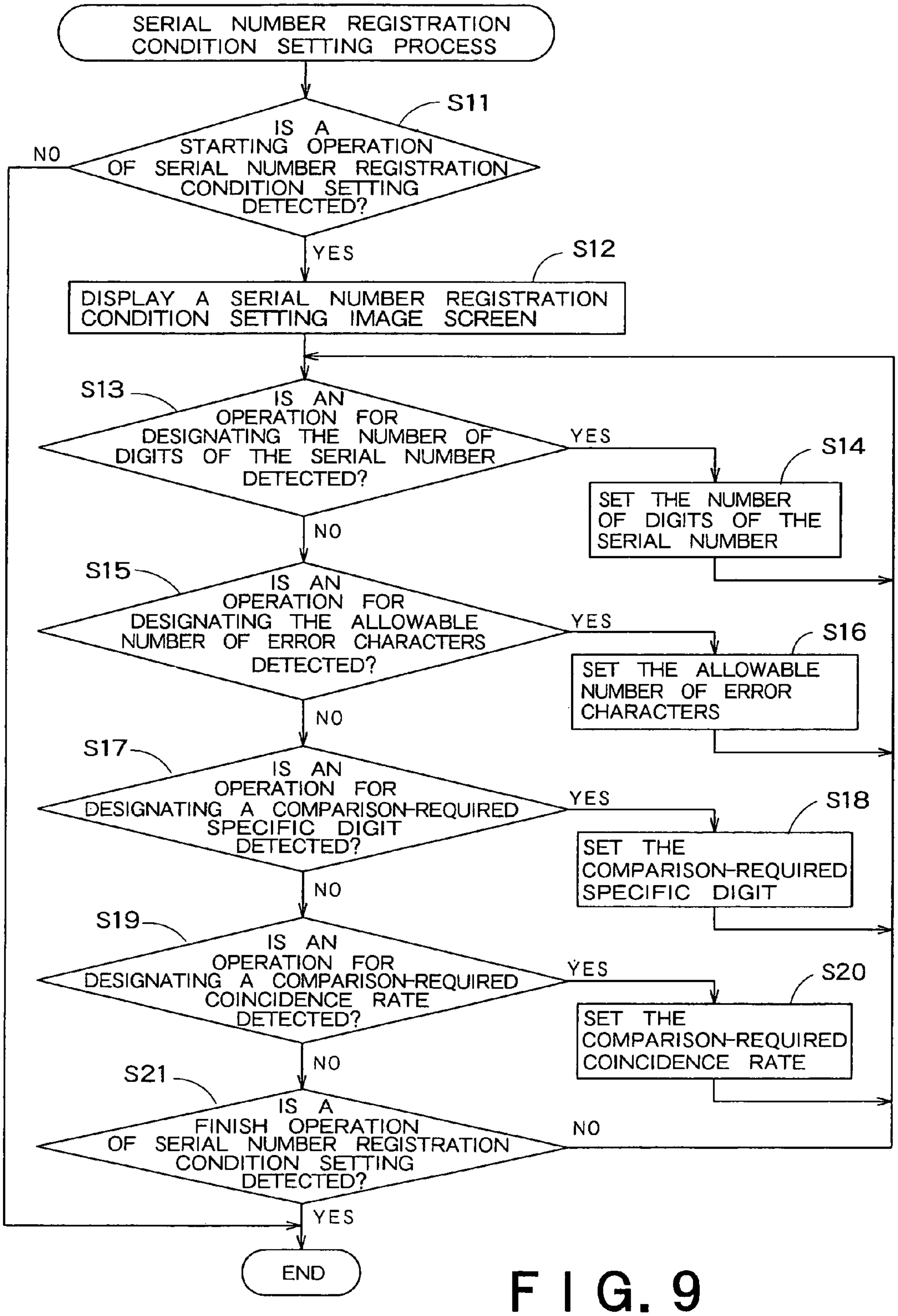
FIG. 9 is a flowchart showing a processing operation in relation to a serial number registration condition setting process performed by the management-side control unit of the banknote management apparatus.

Next, an operation of the banknote management system 1 in this embodiment is described. FIG. 9 is a flowchart showing a processing operation in relation to a serial number registration condition setting process performed by the management-side control unit 38 of the banknote management apparatus 3.

The serial number registration condition setting process shown in FIG. 9 is a process that freely sets a registration condition based on which a serial number of a banknote is registered in the database 33.

The serial number registration condition setting unit 38G in the management-side control unit 38 judges whether or not a starting operation of the serial number registration condition setting image screen for setting a registration condition of a serial number is detected (step S11).

When the start operation of the serial number registration condition setting image screen is detected (step S11: Yes), the serial number registration condition setting unit 38G displays the serial number registration condition setting image screen 70 shown in FIG. 4 on the display unit 31 (step S12).

The serial number registration condition setting unit 38G judges whether or not a designating operation for designating the number of digits of the serial number through the unit for designating the number of digits of a serial number 32F is detected (step S13). The designating operation is an operation for inputting the number of digits to the designating field 71 on the serial number registration condition setting image screen 70 through the unit for designating the number of digits of a serial number 32F.

When a designating operation for designating the number of digits of the serial number is detected (step S13: Yes), the serial number registration condition setting unit 38G sets the number of digits of the serial number in the serial number registration condition setting memory unit 36 (step S14), and the step S14 returns again to the step S13 so as to judge whether a designating operation for designating the number of digits of a serial number is detected or not. When the number of digits of the serial number is set in the serial number registration condition setting memory unit 36 in the step S14, the serial number registration condition setting unit 38G displays the checkbox designating fields 72 whose number corresponds to the number of digits of the serial number on the serial number registration condition setting image screen 70.

When a designating operation for designating the number of digits of the serial number is not detected (step S13: No), the serial number registration condition setting unit 38G judges whether or not a designating operation for designating the allowable number of error characters through the unit for designating the allowable number of error characters 32B is detected (step S15). The designating operation is an operation for inputting the allowable number of digits to the designating field 73 on the serial number registration condition setting image screen 70 through the unit for designating the allowable number of error characters 32B.

When a designating operation for designating the allowable number of error characters is detected (step S15: Yes), the serial number registration condition setting unit 38G sets the allowable number of error characters in the serial number registration condition setting memory unit 36 (step S16), and the step S16 returns again to the step S13 so as to judge whether a designating operation for designating the number of digits of a serial number is detected or not.

When a designating operation for designating the allowable number of error characters is not detected (step S15: No), the serial number registration condition setting unit 38G judges whether or not a designating operation for designating a comparison-required specific digit through the specific digit designating unit 32A is detected (step S17). The designating operation is an operation for checking the checkbox designating field(s) 72 on the serial number registration condition setting image screen 70 through the specific digit designating unit 32A.

When a designating operation for designating a comparison-required specific digit of the serial number is detected (step S17: Yes), the serial number registration condition setting unit 38G sets the comparison-required specific digit of the serial number in the serial number registration condition setting memory unit 36 (step S18), and the step S18 returns to the step S13 so as to judge whether a designating operation for designating the number of digits of a serial number is detected or not.

When a designating operation for designating a comparison-required specific digit of the serial number is not detected (step S17: No), the serial number registration condition setting unit 38G judges whether or not a designating operation for designating a comparison-required coincidence rate of the serial number through the coincidence rate designating unit 32C is detected (step S19). The designating operation is an operation for inputting the check-required coincidence rate to the designating field 74 on the serial number registration condition setting image screen 70 through the coincidence rate designating unit 32C.

When a designating operation for designating a comparison-required coincidence rate of the serial number is detected (step S19: Yes), the serial number registration condition setting unit 38G sets the comparison-required coincidence rate of the serial number in the serial number registration condition setting memory unit 36 (step S20), and the step S20 returns again to the step S13 so as to judge whether a designating operation for designating the number of digits of a serial number is detected or not.

When a designating operation for designating a comparison-required coincidence rate of the serial number is not detected (step S19: No), the serial number registration condition setting unit 38G judges whether or not a finish operation for finishing the setting of the serial number registration condition through the finish button 75 on the serial number registration condition setting image screen 70 is detected (step S21).

When the finish operation is detected (step S21: Yes), the serial number registration condition setting unit 38G finishes the processing operation shown in FIG. 9.

When the finish operation is not detected (step S21: No), the serial number registration condition setting unit 38G returns the process again to the step S13 so as to judge whether a designating operation for designating the number of digits of a serial number is detected or not.

When the start operation for setting a serial number registration condition is not detected (step S11: No), the serial number registration condition setting unit 38G finishes the processing operation shown in FIG. 9.

In the serial number registration condition setting process shown in FIG. 9, since the number of digits of a serial number can be freely set depending on the designating operation of the unit for designating the number of digits of a serial number 32F, it is possible to cope with banknotes having serial numbers of different digits.

In addition, in the serial number registration condition setting process, the allowable number of error characters in the serial number recognition result can be freely set depending on the designating operation of the unit for designating the allowable number of error characters 32B, it is possible to freely set a registration condition range subject to the allowable number of error characters in the serial number recognition result.

In addition, in the serial number recognition condition setting process, since a comparison-required specific digit in the serial number recognition result can be freely set depending on the designating operation of the specific digit designating unit 32A, it is possible to freely set a registration condition range subject to the comparison-required specific digit, depending on a degree of importance of a digit of a serial number which differs from one kind of a banknote to another.

In the serial number registration condition setting process, since a comparison-required coincidence rate between the character recognition results of serial numbers can be freely set depending on the designating operation of the coincidence rate designating unit 32C, it is possible to freely set a registration condition range subject to the allowable coincidence rate between the character recognition results of the serial number.

Figure 10:
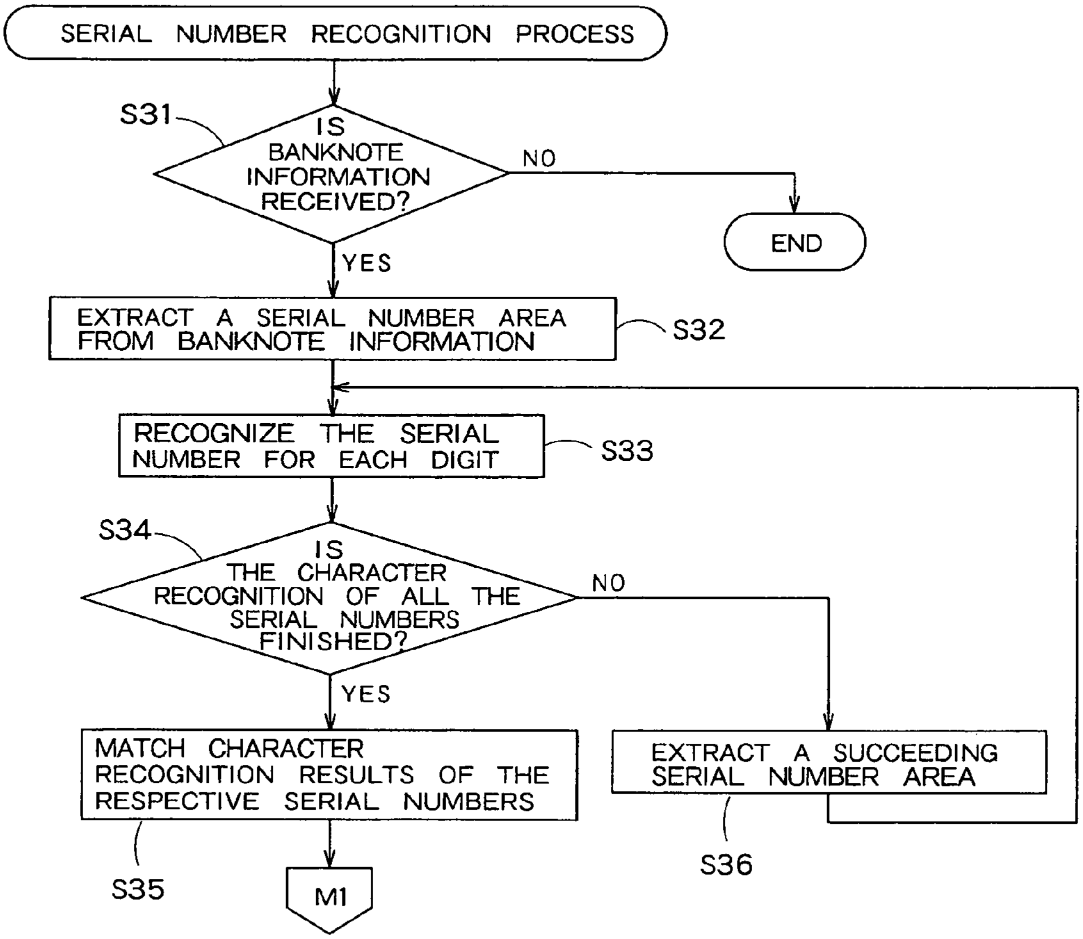
FIG. 10 is a flowchart showing a processing operation in relation to a serial number recognition process performed by the management-side control unit of the banknote management apparatus.
Figure 11:
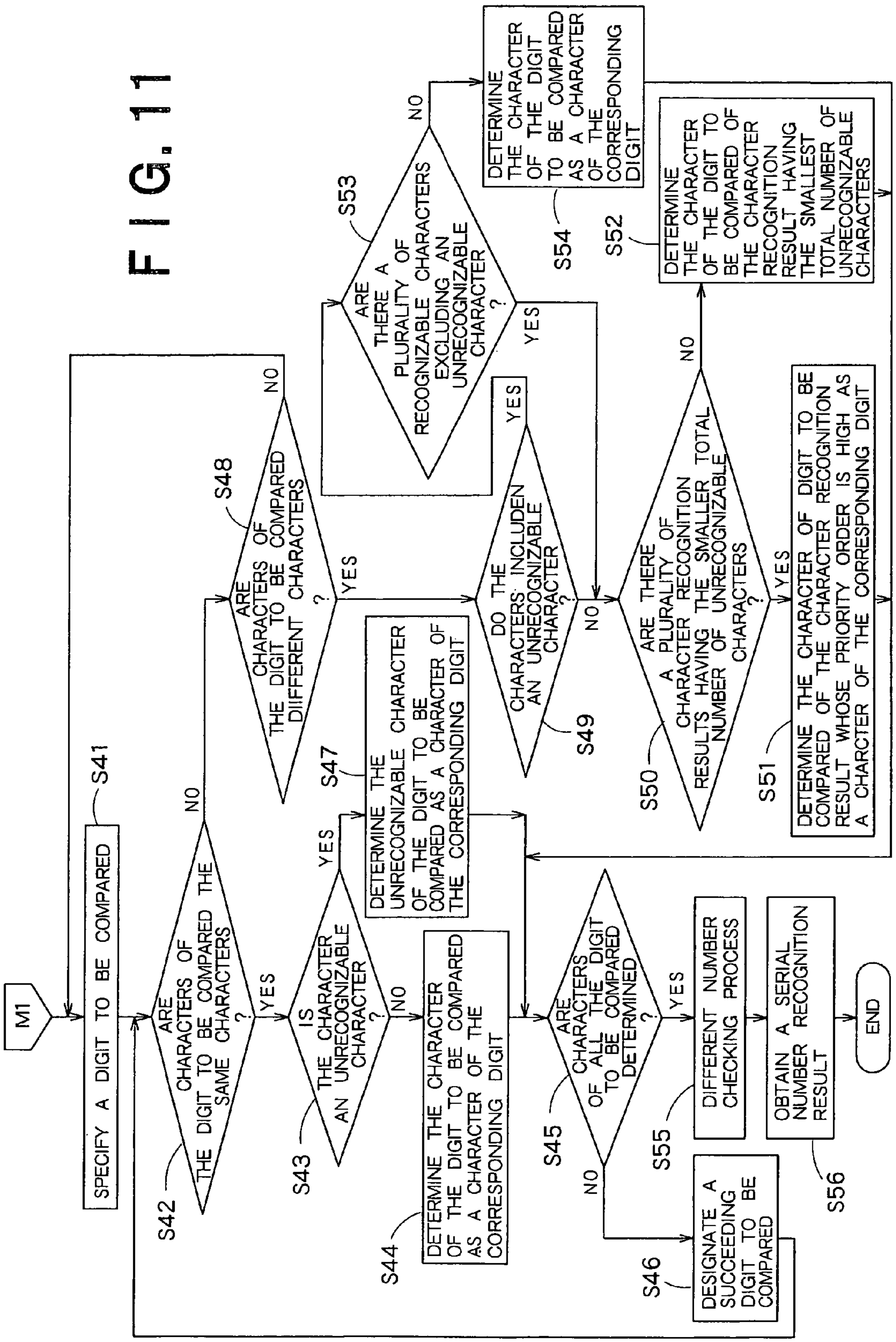
FIG. 11 is a flowchart showing a processing operation in relation to the serial number recognition process performed by the management-side control unit of the banknote management apparatus.

FIGS. 10 and 11 are flowcharts showing a processing operation in relation to a serial number recognition process performed by the management-side control unit 38 of the banknote management apparatus 3.

The serial number recognition process shown in FIGS. 10 and 11 is a process in which a plurality of serial numbers (characters) on a banknote are recognized, character recognition results of the respective serial numbers are compared with each other, and a serial number recognition result is obtained based on the comparison result.

In FIG. 10, the banknote information receiving unit 41 of the serial number recognizing unit 38A in the management-side control unit 38 judges whether banknote information from the banknote handling apparatus 2 is received or not (step S31).

When banknote information is received (step S31: Yes), the serial number area extracting unit 42 in the serial number recognizing unit 38A extracts serial number areas of the respective serial numbers from a banknote image in the banknote information (step S32). For example, when there are a serial number A and a serial number B of the same contents on the banknote, the serial number area extracting unit 42 extracts a serial number area of the serial number A and a serial number area of the serial number B.

When the serial number areas of the respective serial numbers are extracted, the serial number character recognizing unit 43 in the serial number recognizing unit 38A recognizes the serial numbers from the extracted serial number areas (step S33). Then, the serial number character recognizing unit 43 judges whether the character recognition for all the serial numbers is finished or not (step S34).

When the character recognition for all the serial numbers is finished (step S34: Yes), the serial number comparing unit 44 in the serial number recognizing unit 38A compares the character recognition results of the serial numbers (step S35), and the step S35 advances to a process M1 shown in FIG. 11 so as to start to compare and verify the character recognition results of the serial numbers for each digit. In the example shown in FIG. 12, when the character recognition for all the serial numbers is finished, the serial number character recognizing unit 43 obtains "123?567?90" as the character recognition result of the serial number A and "1?3?5676?0" as the character recognition result of the serial number B.

When banknote information is not received (step 31: No), the banknote information receiving unit 41 finishes the processing operation shown in FIG. 10.

When the character recognition for all the serial numbers is not finished (step S34: No), the serial number area extracting unit 42 extracts a serial number area of next serial number (step S36), and the step S36 returns to the step S33 so as to recognize the serial number. Thus, the serial number comparing unit 44 compares and compares the character recognition result of the serial number A and the character recognition result of the serial number B, which are obtained by the serial number character recognizing unit 43.

In the process M1 shown in FIG. 11, the serial number comparing unit 44 in the serial number recognizing unit 38A designates a digit to be compared of the character recognition results (step S41). The digit to be compared corresponds to a digit to be compared for comparing the character recognition results of the serial number A and the serial number B, for example. The digit to be compared is designated from the first digit, the second digit . . . in this order for example.

The character determining unit 45 in the serial number recognizing unit 38A judges whether the characters of the digit to be compared in the character recognition results of the respective serial numbers are the same with each other or not (step S42).

When the characters of the digit to be compared in the character recognition results are the same with each other (step S42: Yes), the character determining unit 45 judges whether the character is an unrecognizable character or not (step S43).

When the character is not an unrecognizable character (step S43: No), the character determining unit 45 judges that the character is a recognizable character, and determines the recognizable character as a determined character of the digit to be compared (step S44). Then, the character determining unit 45 judges whether the characters of all the digits in the character recognition results are determined or not (step S45). For example, when the character recognition result has ten digits, whether the characters of all the ten digits are determined or not is judged.

When the characters of all the digits in the character recognition results are not determined (step S45: No), the serial number checking unit 44 designates a next digit to be compared, which is not yet compared, in the character recognition results (step S46), and the step S46 returns to the step S42 so as to judge whether the characters of the digit to be compared are the same with each other or not.

When the character is judged to be an unrecognizable character in the step S43 (step S43: Yes), the character determining unit 45 determines the unrecognizable character as an error character of the digit to be compared (step S47), and the step S47 advances to the step S45 so as to judge whether the characters of all the digits in the character recognition results are determined or not.

When the characters of the digit to be compared in the character recognition results are found to be not the same character (step S42: No), the serial number comparing unit 44 judges whether characters of the digit to be compared in the character recognition results are different characters or not (step S48).

When the characters of the digit to be compared in the character recognition results are different characters (step S48: Yes), the character determining unit 45 judges whether these different characters include an unrecognizable character or not (step S49).

When these different characters do not include an unrecognizable character (step S49: No), the character determining unit 45 judges that these different characters are recognizable characters, and judges whether or not there are a plurality of character recognition results having the smallest number of unrecognizable characters among the number of unrecognizable characters of the character recognition results of the respective serial numbers stored in the memory unit for the number of unrecognizable characters 49 (step S50).

When there are a plurality of character recognition results having the smallest number of unrecognizable characters (step S50: Yes), the character determining unit 45 determines, as a determined character of the digit to be compared, a character of the digit of the character recognition result of the serial number of a superior priority stored in the priority order memory unit 50 among the character recognition results having the smallest number of unrecognizable characters (step S51), and the step S51 advances to the step S45 so as to judge whether the characters of all the digits in the character recognition results are determined or not.

When the smallest number of the unrecognizable characters in the character recognition result of the serial number A and that of the serial number B are the same, the priority order of the serial number A is higher than that of the serial number B, the eighth digit in the character recognition result of the serial number A is "8", and the eighth digit in the character recognition result of the serial number B is "6", the character determining unit 45 determines the "8" of the eighth digit in the character recognition result of the serial number A, as a determined character of the eighth digit.

When it is judged that the number of the character recognition results having the smallest number of unrecognizable characters is not plural in the step S50 (step S50: No), the character determining unit 45 determines, as a determined character of the digit to be compared, the character of the digit of the character recognition result having the smallest number of unrecognizable characters (step S52). Then, the step S52 advances to the step S45 so as to judge whether the characters of all the digits in the character recognition results are determined or not.

In the example shown in FIG. 12, when the number of unrecognizable characters in the character recognition result of the serial number A is two, the number of unrecognizable characters in the character recognition result of the serial number B is three, the eighth digit in the character recognition result of the serial number A is "8", and the eighth digit in the character recognition result of the serial number B is "6", the character determining unit 45 determines the "8" of the eighth digit in the character recognition result of the serial number A, as a determined character of the eighth digit.

When it is judged that these different characters include an unrecognizable character in the step S49 (step S49: Yes), the character determining unit 45 judges whether or not there are a plurality of recognizable characters in the different characters, excluding the unrecognizable character (step S53).

When there are a plurality of recognizable characters of the digit to be compared (step S53: Yes), the S53 advances to the step S50 in which the character determining unit 45 judges whether or not there are a plurality of character recognition results having the smallest number of unrecognizable characters.

When it is judged that the number of recognizable characters of the digit to be compared is not plural (step S53: No), the character determining unit 45 determines the character as a determined character of the digit to be compared (step S54), and the step S54 advances to the step S45 so as to judge whether the characters of all the digits in the character recognition results are determined or not.

When it is judged that the characters of all the digits in the character recognition results are determined in the step S45 (step S45: Yes), the different number checking unit 46 in the serial number recognizing unit 38A performs a different number checking process of the character recognition results of the respective serial numbers (step S55).

For example, as shown in FIG. 12, in the different number checking process, the character recognition result "123?56?890" of the serial number A and the character recognition result "1?3?5676?0" of the serial number B are compared with each other for each digit. Then, the number of digits X including the same recognizable characters of the first digit, the third digit, the fifth digit, the sixth digit and the tenth digit is checked, the number of digits Y including the unrecognizable characters of the second digit, the fourth digit, the seventh digit and the ninth digit is checked, and the number of digits Z including different unrecognizable characters of the eighth digit is checked.

Based on the number of digits X of the same recognizable characters and the number of digits Z of the different recognizable characters, the different number checking unit 46 calculates a coincidence rate between the character recognition results of the serial number A and the serial number B with the use of an expression X/(X+Z).

When the different number checking process is finished in the step S55, the serial number recognition result obtaining unit 47 obtains a serial number recognition result based on the characters of all the digits in the character recognition result determined in the step S45 (step S56), and finishes the processing operation shown in FIG. 11.

In the serial number recognition process shown in FIGS. 10 and 11, when a plurality of serial numbers of the same contents are described in a banknote, the character recognition results of these serial numbers are compared with each other. Then, when the characters of the corresponding digit in the character recognition results are the same recognizable character, the character is determined as a determined character of the digit. When the characters of the corresponding digit in the character recognition results are different recognizable characters, a given character among these different characters is determined as a determined character of the digit. When the characters of the corresponding digit in the character recognition, results are unrecognizable characters, the character of the digit is determined as an error character "?". After the characters of all the digits in the character recognition results have been determined, a serial number recognition result including the determined character(s) and/or the error character(s) "?" is obtained. Thus, the characters of all the digits in the serial number recognition result can be determined, based on the comparison result among the plurality of character recognition results.

In addition, in the serial number recognition process, when the characters of the corresponding digit in the character recognition results are recognizable different characters, a given character among these different characters is determined as a determined character of the digit. At this time, since the character of the digit in the character recognition result having the smallest number of unrecognizable characters is determined as a determined character of the digit, the characters of the respective digits in the serial number recognition result can be easily determined.

In addition, in the serial number recognition result, a given character among these different characters is determined as a determined character of the digit. At this time, when there are a plurality of character recognition results having the smallest number of unrecognizable characters among the plurality of character recognition results, the character of the digit in the character recognition result of a higher priority order stored in the priority order memory unit 50 is determined as a determined character of the digit. Thus, the characters of the respective digits in the serial number recognition result can be easily determined.

Figure 13:
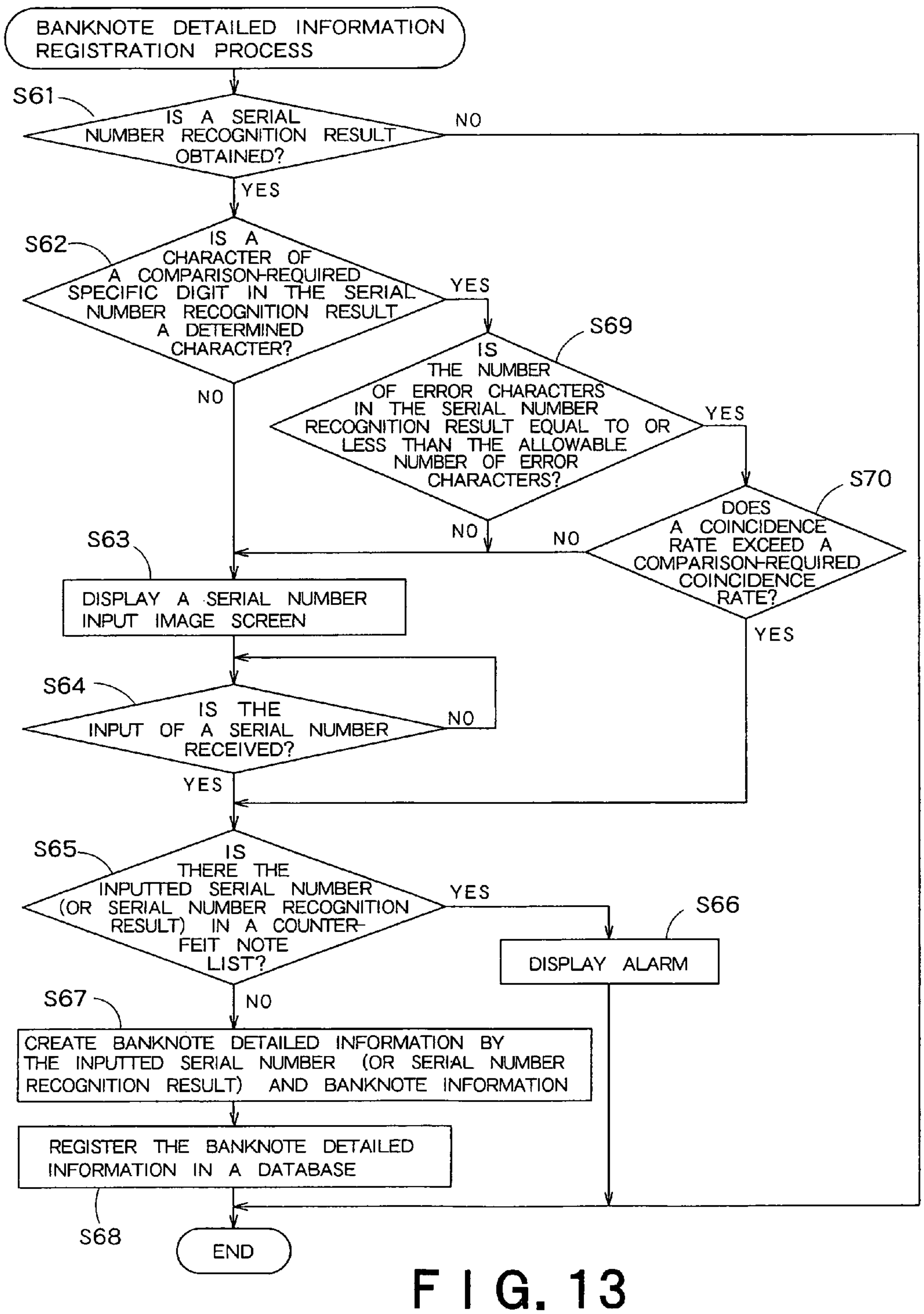
FIG. 13 is a flowchart showing a processing operation in relation to a banknote detailed information registration process performed by the management-side control unit of the banknote management apparatus.

FIG. 13 is a flowchart showing a processing operation in relation to a banknote detailed information registration process of the management-side control unit 38 of the banknote management apparatus 3.

When a serial number recognition result of the serial number recognizing unit 38A meets a predetermined registration condition, the banknote detailed information registration process shown in FIG. 13 registers banknote detailed information about the serial number recognition result in the database 33. On the other hand, when a serial number recognition result of the serial number recognizing unit 38A does not meet a predetermined registration condition, the banknote detailed information registration process registers banknote detailed information about an inputted serial number inputted by an inputting operation in the database 33.

When a serial number recognition result is obtained by the serial number recognizing unit 38A (step S61: Yes), the specific digit judgment unit 61 in the serial number registration condition processing unit 38B of the management-side control unit 3 shown in FIG. 13 judges whether a character of the comparison-required specific digit in the serial number recognition result is a determined character or not (step S62).

When the character of the comparison-required specific digit in the serial number recognition result is not a determined character (step S62: No), the serial number input demanding unit 65 in the serial number registration condition processing unit 38B displays the serial number input image screen 80 (see, FIG. 7) demanding an inputting operation of a serial number on the screen of the display unit 31 (step S63).

The serial number receiving unit 66 in the serial number registration condition processing unit 38B judges whether an inputting operation for inputting a serial number in the serial number input field 81 on the serial number input image screen 80 is detected or not (step S64).

When an inputting operation of a serial number is detected (step S64: Yes), the counterfeit note list judgment unit 64 in the serial number registration condition processing unit 38B judges whether the inputted serial number (or the serial number recognition result) falls under any of serial numbers in the counterfeit note list (step S65).

When the inputted serial number (or the serial number recognition result) falls under any of the serial numbers in the counterfeit note list (step S65: Yes), the counterfeit note list judgment unit 64 judges that the banknote having the inputted serial number (or the serial number recognition result) is a counterfeit note, and displays an alarm informing that the banknote is a counterfeit note on the screens of the display unit 31 and the operation display unit 16 (step 66). Then, the counterfeit note list judgment unit 64 finishes the processing operation shown in FIG. 13.

As a result, a user can recognize the presence of a counterfeit note based on the alarm display of the display unit 31 and the operation/display unit 16.

When the counterfeit note list judgment unit 64 judges that the inputted serial number (or the serial number recognition result) does not fall under any of the serial numbers in the counterfeit note list (step S65: No), the banknote detailed information creating unit 38C in the management-side control unit 38 creates banknote detailed information based on the inputted serial number (or the serial number recognition result) of the banknote and the banknote information (step S67).

When the banknote detailed information is created by the banknote detailed information creating unit 38C, the DB control unit 38E in the management-side control unit 38 registers the banknote detailed information in the database 33 (step S68), and finishes the processing operation shown in FIG. 13.

When a serial number recognition result is not obtained in the step S61 (step S61: No), the serial number registration condition processing unit 38B finishes the processing operation shown in FIG. 13.

When it is judged that the character of the comparison-required specific digit in the serial number recognition result is a determined character in the step S62 (step S62: Yes), the unit for judging the allowable number of error characters 62 in the serial number registration condition processing unit 38B judges whether or not the number of error characters in the serial number recognition result is equal to or less than the allowable number of error characters (step. S69).

When it is judged that the number of error characters in the serial number recognition result is not equal to or less than the allowable number of error characters (step S69: No), the serial number input demanding unit 65 advances the process to a step S63 so as to demand an inputting operation of a serial number.

When it is judged that the number of error characters in the serial number recognition result is equal to or less than the allowable number of error characters in the step S69 (step S69: Yes), the coincidence rate judgment unit 63 in the serial number registration condition processing unit 38B judges whether or not a coincidence rate between the character recognition results of the respective serial numbers exceeds the comparison-required coincidence rate (step S70).

When it is judged that the coincidence rate exceeds the comparison-required coincidence rate (step S70: Yes), the counterfeit note list judgment unit 64 judges that a recognition reliability of the serial number recognition result is high, and advances the process to a step S65 so as to judge whether the serial number recognition result falls under any of the serial numbers in the counterfeit note list.

When it is judged that the coincidence rate between the character recognition results of the respective serial numbers do not exceed the comparison-required coincidence rate in the step S70 (step S70: No), the serial number input demanding unit 65 judges that a recognition reliability of the serial number recognition result is low, and advances the process to the step S63 so as to demand an inputting operation of the serial number.

In the banknote detailed information registration process shown in FIG. 13, the serial number recognizing unit 38A obtains a serial number recognition result. Then, when the character of the comparison-required specific digit in the serial number recognition result is a determined character, the number of error characters in the serial number recognition result is equal to or less than the allowable number of error characters, the coincidence rate between the character recognition results exceeds the comparison-required coincidence rate, and the serial number recognition result does not fall under any of the serial numbers in the counterfeit note list, it is judged that the serial number recognition result meets the predetermined registration conditions. Then, banknote detailed information is created based on the serial number recognition result and the banknote information, and the thus created banknote detailed information is registered in the database 33. Even when the serial number recognition result includes an error character "?", the serial number recognition result is judged as a serial number that can be specified and the serial number recognition result can be registered in the database 33, as long as the predetermined registration conditions are met. Thus, an operational burden on a user who inputs a serial number can be remarkably reduced.

In addition, in the banknote detailed information registration process, the serial number recognizing unit 38A obtains a serial number recognition result. When the character of the comparison-required specific digit in the serial number recognition result is an error character "?", or the number of error characters in the serial number recognition result exceeds the allowable number of error characters, or the coincidence rate between the character recognition results of the respective serial numbers does not exceed the comparison-required coincidence rate, it is judged that the serial number recognition result does not meet the predetermined registration conditions, and an inputting operation of the serial number is demanded. That is to say, when the predetermined registration conditions are not met, the serial number recognition result is judged as a serial number that cannot be specified and an inputting operation of the serial number is demanded. Thus, needless registration, i.e., registration of the serial number that cannot be specified as it is in the database 33, can be avoided.

Figure 14:
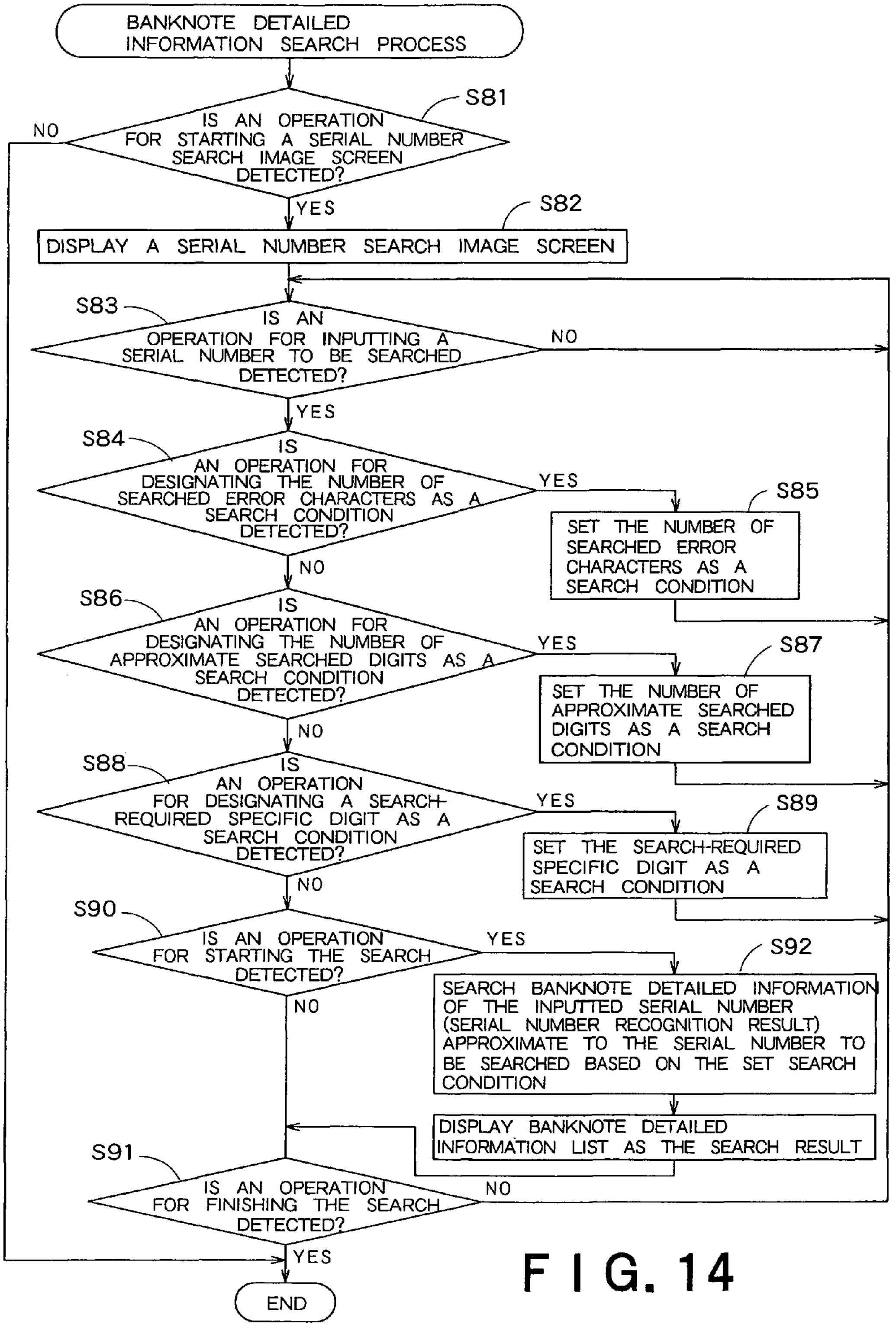
FIG. 14 is a flowchart showing a processing operation in relation to a banknote detailed information search process performed by the management-side control unit of the banknote management apparatus.

FIG. 14 is a flowchart showing a processing operation in relation to a banknote detailed information search process performed by the management-side control unit 38 of the banknote management apparatus 3.

The banknote detailed information search process shown in FIG. 14 is a process for searching banknote detailed information of a serial number recognition result which is approximate to the serial number to be searched, from banknote detailed information about serial numbers including error characters registered in the database 33.

In FIG. 14, the management-side control unit 38 judges whether a start operation of the serial number search image screen 90 shown in FIG. 8 is detected or not (step S81).

When a start operation of the serial number search image screen 90 is detected (step S81: Yes), the management-side control unit 38 displays the serial number search image screen 90 on the screen of the display unit 31 (step S82).

The search condition setting unit 38H in the management-side control unit 38 judges whether an inputting operation of a serial number to be searched through the information-to-be-searched inputting unit 32D is detected or not (step S83). The inputting operation is an operation for inputting a serial number to be searched in the serial number input field 92 on the serial number search image screen 90 through the information-to-be-searched inputting unit 32D.

When an inputting operation of a serial number to be searched is detected (step S83: Yes), the search condition setting unit 38H judges whether or not a designating operation for designating, as a search condition, the number of searched error characters of serial numbers in the banknote detailed information registered in the database 33 through the search condition designating unit 32E is detected (step S84). The designating operation is an operation for designating and inputting a search condition in the designating field 93 on the serial number search image screen 90 through the search condition designating unit 32E.

When a designating operation for designating the number of searched error characters as a search condition is detected (step S84: Yes), the search condition setting unit 38H sets the number of searched error characters as a search condition in the search condition setting memory unit 37 (step S85), and advances the process to a step S83 so as to judge whether an inputting operation of a serial number to be searched is detected or not.

When a designating operation for designating the number of searched error characters as a search condition is not detected (step S84: No), the search condition setting unit 38H judges whether or not a designating operation for designating, as a search condition, the number of approximate searched digits of serial numbers in the banknote detailed information registered in the database through the search condition designating unit 32E is detected (step S86). The designating operation is an operation for designating the number of approximate searched digits in the designating field 94 on the serial number search image screen 90 through the search condition designating unit 32E.

When a designating operation for designating the number of approximate searched digits as a search condition is detected (step S86: Yes), the search condition setting unit 38H sets the number of approximate searched digits as a search condition in the search condition setting memory unit 37 (step S87), and advances the process to the step S83 so as to judge whether an inputting operation of a serial number to be searched is detected or not.

When a designating operation for designating the number of approximate searched digits as a search condition is not detected (step S86: No), the search condition setting unit 38H judges whether or not a designating operation for designating, as a search condition, a search-required specific digit of serial numbers in the banknote detailed information registered in the database 33 through the search condition setting unit 32E is detected (step S88). The designating operation is an operation for inputting a check in the checkbox designating field 95 on the serial number search image screen 90 through, the search condition setting unit 32E. This search condition is intended for only banknote detailed information about a serial number whose search-required specific digit is a determined character.

When a designating operation for designating the search-required specific digit of a serial number as a search condition is detected (step S88: Yes), the search condition setting unit 38H sets the search-required specific digit as a search condition in the search condition setting memory unit 37 (step S89), and advances the process to the step S83 so as to judge whether an inputting operation of a serial number to be searched is detected or not.

When a designating operation for designating the search-required specific digit of a serial number as a search condition is not detected (step S88: No), the search control unit 38F in the management-side control unit 38 judges whether a search start operation is detected or not (step S90).

When a search start operation is not detected (step S90: No), the search control unit 38F judges whether a search finish operation is detected or not (step S91).

When a search finish operation is detected (step S91: Yes), the search control unit 38F finishes the processing operation shown in FIG. 14. On the other hand, when a search finish operation is not detected (step S91: No), the search control unit advances the process to the step S83 so as to judge whether an inputting operation of a serial number to be searched is detected or not.

When a search start operation is detected (step S90: Yes), the search control unit 83F searches, from the database 33, banknote detailed information of a serial number (a serial number recognition result or an inputted serial number) approximate to the serial number to be searched that has been inputted in the step S83, based on a search condition set in the search condition setting memory unit 37 (step S92). Then, the search control unit 83F displays a list of banknote detailed information as the search result on the screen of the display unit 31 (step S93), and advances the process to the step S91 whether a search finish operation is detected or not.

When an inputting operation of a serial number to be searched is not detected (step S83: No), the search condition setting unit 38H advances the process to the step S83 so as to judge whether an inputting operation of a serial number to be searched is detected or not.

In the banknote detailed information registration process shown in FIG. 14, based on a search condition set in the search condition setting memory unit 37, banknote detailed information about an identification information recognition result approximate to the serial number to be searched, which has been inputted by the information-to-be-searched inputting unit, is searched from banknote detailed information of serial number recognition results including determined characters and/or error characters registered in the database 33. Thus, the banknote detailed information of a serial number recognition result approximate to the serial number to be searched can be easily searched from the banknote detailed information about serial number recognition results including undetermined characters.

In this embodiment, based on a determined character or an error character "?" in the serial number recognition result when a serial number recognition result meets a predetermined registration condition, for example, when the serial number recognition result can be specified regardless of the presence of an error character in the serial number recognition result, the serial number recognition result is registered in the database 33. On the other hand, when a serial number recognition result does not meet a predetermined registration condition, for example, when the serial number recognition result cannot be specified, registration of the serial number recognition result in the database 33 is forbidden. As a result, in this embodiment, needless registration of the serial number recognition result that cannot be specified in the database 33 as it is can be avoided. In addition, even when a serial number recognition result includes an error character "?", the serial number recognition result can be registered in the database 33 without any inputting operation, as long as the serial number recognition result can be specified. Thus, an operational burden on a user who inputs a serial number can be remarkably reduced.

In addition, in this embodiment, when a character of a comparison-required specific digit in the serial number recognition result is a determined character, the serial number recognition result is judged to be capable of being specified, and the serial number recognition result is registered in the database 33. On the other hand, when a character of the comparison-required specific digit is an error character, the serial number recognition result is judged to be incapable of being specified, and registration of the serial number recognition result in the database 33 is forbidden. As a result, in this embodiment, even when the serial number recognition result includes an error character, the serial number recognition result can be registered in the database 33 without any inputting operation, as long as the serial number recognition result meets the condition of the comparison-required specific digit. Thus, an operational burden on a user who inputs a serial number can be remarkably reduced.

In addition, in this embodiment, a user can uses the specific digit designating unit 32A so as to freely designate, as a comparison-required specific digit, a character required for recognizing a serial number recognition result, such as a character representing a Mint or a digit describing a character used for checking digit. Thus, it is possible to cope with various banknotes of different digits describing characters required for recognition sufficiently. Further, a registration condition range subject to a comparison-required specific digit can be freely set.

In addition, in this embodiment, when the number of error characters in a serial number recognition result is equal to or less than the allowable number of error characters, the serial number recognition result is judged to be capable of being specified, and the serial number recognition result is registered in the database 33. On the other hand, when the number of error characters in the serial number recognition result exceeds the allowable number of error characters, the serial number recognition result is judged to be incapable of being specified, and registration of the serial number recognition result in the database 33 is forbidden. As a result, in this embodiment, even when the serial number recognition result includes an error character, the serial number recognition result can be registered in the database 33 without any inputting operation, as long as the serial number recognition result meets the condition of the allowable number of error characters. Thus, an operational burden on a user who inputs a serial number can be remarkably reduced.

In addition, in this embodiment, a user can use the unit for designating the allowable number of error characters 32B so as to freely designate the allowable number of error characters for recognizing a serial number recognition result. Thus, it is possible to cope with various banknotes of different digits describing characters required for recognition sufficiently. Further, a registration condition range subject to the number of error characters can be freely set.

In addition, in this embodiment, when a character of a comparison-required specific digit in a serial number recognition result is a determined character, and when the number of error characters in the serial number recognition result is equal to or less than the allowable number of error characters, the serial number recognition result is judged to meet the predetermined registration conditions. On the other hand, when the character of the comparison-required specific digit in the serial number recognition result is an error character, or when a character of the comparison-required specific digit in the serial number recognition result is a determined character, and when the number of error characters in the serial number recognition result exceeds the allowable number of error characters, the serial number recognition result is judged not to meet the predetermined registration conditions. As a result, even when the serial number recognition result includes an error character, the serial number recognition result can be registered in the database 33 without any inputting operation, as long as the serial number recognition result meets the conditions of the comparison-required specific digit and the allowable number of error characters. Thus, an operational burden on a user who inputs a serial number can be remarkably reduced.

In addition, in this embodiment, when a serial number recognition result does not meet the predetermined registration condition, an inputting operation for the serial number recognition result is demanded. When an inputting operation for inputting the serial number recognition result is detected, the serial number recognition result inputted by the inputting operation is registered in the database 33. As a result, only when the serial number recognition result does not meet the predetermined registration condition, an inputting operation of the serial number recognition result is demanded. Thus, an operational burden on a user who inputs a serial number can be remarkably reduced.

In addition, in this embodiment, banknote detailed information about a serial number recognition result approximate to the serial number to be searched, which has been inputted by the information-to-be-searched inputting unit 32D, is searched from banknote detailed information about serial number recognition results including determined characters and/or error characters registered in the database 33. Thus, even when the serial number recognition result includes an error character, banknote detailed information about a serial number recognition result approximate to the serial number to be searched can be easily searched.

In addition, in this embodiment, when a banknote has a plurality of serial numbers of the same contents, character recognition results of these serial numbers are compared with each other. When all the characters of the corresponding digit in the character recognition results are the same recognizable characters, the character is determined as a determined character of the digit. When the characters of the corresponding digit in the character recognition results are different characters including at least one recognizable character, a given character among these different characters is determined as a determined character of the digit. When all the characters of the corresponding digit in the character recognition results are unrecognizable characters, the character of the digit is determined as an error character. After the characters of all the digits in the character recognition results have been determined, a serial number recognition result including a determined character and/or an error character is obtained. Thus, based on the comparison result among the plurality of character recognition results, the characters of all the digits in the serial number recognition result can be determined.

In addition, when characters of the corresponding digit in the character recognition results are different characters including at least one recognizable character, and a given character among these different characters is determined as a determined character of the corresponding digit, the character of the corresponding digit of the character recognition result having the smallest number of unrecognizable characters among the plurality of character recognition results, is determined as a determined character of the corresponding digit. Thus, the characters of the respective digits in the serial number recognition result can be easily determined.

In addition, in this embodiment, when characters of the corresponding digit in the character recognition results are different characters including at least one recognizable character, and a given character among these different characters is determined as a determined character of the corresponding digit, the character of the corresponding digit of the character recognition result of a higher priority order stored in the priority order memory unit 50 among the plurality of character recognition results, is determined as a determined character of the corresponding digit. Thus, the characters of the respective digits in the serial number recognition result can be easily determined.

In addition, in this embodiment, when a coincidence rate calculated by the different number checking unit 46 does not exceed a comparison-required coincidence rate which has been designated by the coincidence rate designating unit 32C, the serial number recognition result is judged not to meet the predetermined registration condition. As a result, in this embodiment, when a coincidence rate does not exceed a comparison-required coincidence rate, it is judged that the coincidence rate between the recognizable characters of the corresponding digit in the character recognition results is low, and that a recognition reliability of the serial number recognition result is low. Thus, registration of the serial number recognition result in the database 33 is forbidden. Thus, problem caused by error recognition of the serial number recognition result can be avoided.

In addition, in this embodiment, for example, even if a customer comes a financial institute and claims that this banknote is a counterfeit note that has been dispensed from an ATM of this financial institute, the serial number of the banknote is searched from the banknote detailed information registered in the database 33, and the search result is displayed on the screen of the display unit 31. Thus, in this embodiment, when the corresponding serial number is registered, the claim of the customer is accepted. On the other hand, when the corresponding serial number is not registered, it is possible to argue against the customer that this banknote is not a banknote that has been dispensed from an ATM of this financial institute.

In addition, in this embodiment, for example, when a financial institute dispenses an unfit banknote to a superordinate bank, the banknote detailed information of the unfit note is registered in the database 33. In this case, even if the superordinate bank claims that the dispensed banknote is a counterfeit note, the serial number of the banknote is searched from the banknote detailed information registered in the database 33, and the search result is displayed on the screen of the display unit 31. Thus, in this embodiment, when the corresponding serial number is registered, the claim of the superordinate bank is accepted. On the other hand, when the corresponding serial number is not registered, it is possible to argue against the superordinate bank that this banknote is not a banknote that has been dispensed from this financial institute.

In this embodiment, there is described an example in which a plurality of, e.g., two serial numbers of the same contents are described on a banknote. However, even when there is only one serial number on a banknote, the same effect can be provided. In this case, the serial number recognizing unit 38A recognizes the serial number through the serial number character recognizing unit 43, and obtains a character recognition result including a recognizable character and/or an unrecognizable character. Then, after the processes by the character determining unit 45 and the serial number recognition result obtaining unit 47, the serial number recognizing unit 38A obtains the respective digits of the obtained character recognition result as a serial number recognition result. When there is only one serial number, the serial number recognizing unit 38A can recognize a serial number recognition result, without using the serial number comparing unit 44, the different number checking unit 46, the unit for calculating the number of unrecognizable characters 48, the memory unit for the number of unrecognizable characters 49, and the priority order memory unit 50

Also in this case, when it is judged whether or not the serial number recognition result obtained by the serial number recognizing unit 38A meets a predetermined registration condition, the serial number registration condition processing unit 38B judges whether or not the registration conditions of the comparison-required specific digit and the allowable number of error characters are met, by means of the specific digit judgment unit 61 and the unit for judging the allowable number of error characters 62. When the unit for judging the allowable number of error characters 62 judges that the number of error characters in the serial number recognition result is equal to or less than the allowable number of error characters, the serial number registration condition processing unit 38B judges whether the serial number recognition result falls under any of serial numbers in the counterfeit note list or not, without performing the judgment operation of the coincidence rate judgment unit 63.

In this manner, even the number of serial numbers of a banknote is one, the banknote management apparatus 3 obtains a character recognition result of the serial number, and obtains a serial number recognition result based on the obtained character recognition result. When the serial number recognition result meets a predetermined registration condition, the banknote detailed information based on the serial number recognition result is registered in the database 33. On the other hand, when the serial number recognition result does not meet the predetermined registration condition, registration of the serial number recognition result is forbidden, and an inputting operation for inputting the serial number is demanded.

In addition, in this embodiment, when there are a plurality of serial numbers of the same contents on a banknote, the character recognition results of the serial numbers are compared with each other for each digit, and the characters of all the digits in the character recognition results are determined by the character determining unit 45, so as to obtain a serial number recognition result. However, for example, among the number of unrecognizable characters in the character recognition result of the serial number A and the number of unrecognizable characters in the character recognition result of the serial number B, the characters of all the digits of the character recognition result having the smallest number of unrecognizable characters may be selected and determined, so as to obtain a serial number recognition result. In this case, a process burden for determining characters of the respective digits in the serial number recognition result can be significantly reduced.

In addition, in this embodiment, it is judged whether the second registration condition is met or not based on the number of error characters in the serial number recognition result. However, for example, it is possible to judge whether the second registration condition is met or not based on the number of determined characters in the serial number recognition result. When the number of determined characters in the serial number recognition result is equal to or more than the number of comparison-required determined characters, the second registration condition may be judged to be met. In this case, a unit for designating the number of determined characters for designating the number of comparison-required determined characters, in place of the unit for designating the allowable number of error characters 32B, provides the same effect.

In addition, in this embodiment, the serial number recognition result is registered in the database 33. In this case, when the first registration condition relating to a comparison-required specific digit, the second registration condition relating to the number of error characters, the third registration condition relating to a coincidence rate, and the fourth registration condition relating to a counterfeit note are respectively met, the banknote detailed information including the serial number recognition result is registered in the database 33. However, for example, when any one or a plurality of the first registration condition relating to a comparison-required specific digit, the second registration condition relating to the number of error characters, the third registration condition relating to a coincidence rate, and the fourth registration condition relating to a counterfeit note is(are) met, it is possible to register the banknote detailed information including the serial number recognition result in the database 33.

In addition, in this embodiment, the serial number recognizing unit 38A is disposed on the banknote management apparatus 3. However, the serial number recognizing unit 38A may be disposed on the banknote handling apparatus 2. In this case, a burden on the banknote management apparatus can be significantly reduced.

In addition, in this embodiment, all the banknote detailed information is registered in the database 33. However, only a serial number (a serial number recognition result or an inputted serial number) of a banknote among the banknote detailed information, may be registered.

In addition, in this embodiment, there is described by way of example the banknote management system 1 that register banknote detailed information including a serial number of a banknote in the database 33. However, it goes without saying that the present invention can be applied to a system that manages a paper sheet such as a coupon and a check based on identification information described on the paper sheet for recognizing the paper sheet.

Although the embodiment has been as described above, the scope of the technical idea of the present invention is not limited thereto, and various embodiments can be achieved without departing from the scope of the technical idea recited in the claims. In addition, the effects described in this embodiment are not limited thereto.

Out of the respective processes described in this embodiment, a part of or all of the processes which are described as the automatic processes may be manually performed. Alternatively, a part of or all of the processes which are described as the manual processes may be automatically performed by a known method. Moreover, unless otherwise specified, the process procedure, the control procedure, the concrete names, and the information including various data and parameters, may be optionally changed.

Further, the illustrated respective constituent elements of the apparatuses are functional and conceptual, and it is not necessary that the constituent elements are physically structured as the illustration. Namely, the concrete form of dispersion and integration of the respective apparatuses is not limited to the illustrated examples, but all or one of the apparatuses can be functionally or physically dispersed and integrated at optional unit in accordance with various loads and used conditions.

Furthermore, all or an optional part of the respective process functions performed in the respective apparatuses may be realized by a CPU (Central Processing Unit) (or a micro computer such as an MPU (Micro Processing Unit) and an MCU (Micro Controller Unit)) and an information processing program that is analyzed and executed by the CPU (or a micro computer such as an MPU and an MCU), or may be realized as a hardware by a wired logic.

The invention claimed is:

1. A paper sheet management apparatus comprising:

an identification information recognizing unit configured to perform character recognition based on identification information of a paper sheet, composed of predetermined digits for identifying a paper sheet, obtains a character recognition result including a recognizable character and/or an unrecognizable character, and obtains an identification information recognition result including a recognizable determined character and/or an unrecognizable undetermined character based on the obtained character recognition result;

a registration condition judgment unit configured to judge whether or not the identification information recognition result meets a predetermined registration condition, based on the determined character or the undetermined character in the identification information recognition result which has been obtained by the identification information recognizing unit; and a registration control unit configured to register the identification information recognition result in a database when the registration condition judgment unit judges that the identification information recognition result meets the predetermined registration condition even though the identification information recognition result includes the undetermined character, and that is configured to forbid registration of the identification information recognition result in the database when the registration condition judgment unit judges that the identification information recognition result does not meet the predetermined registration condition.

2. The paper sheet management apparatus according to claim 1, comprising a specific digit designating unit that designates a given specific digit among the predetermined digits of the identification information recognition result, wherein the registration condition judgment unit judges that: the identification information recognition result meets the predetermined registration condition when a character of the specific digit in the identification information recognition result, which has been designated by the specific digit designating unit, is the determined character; and judges that the identification information recognition result does not meet the predetermined registration condition when a character of the specific digit in the identification information recognition result, which has been designated by the specific digit designating unit, is the undetermined character.

3. The paper sheet management apparatus according to claim 1, comprising a unit for designating an allowable number of undetermined characters among the predetermined digits of the identification information recognition result, wherein the registration condition judgment unit judges that: the identification information recognition result meets the predetermined registration condition when a total number of the undetermined characters in the identification information recognition result is equal to or less than the allowable number of undetermined characters which has been designated by the unit for designating the allowable number of undetermined characters; and judges that the identification information recognition result does not meet the predetermined registration condition when the total number of the undetermined characters in the identification information recognition result exceeds the allowable number of undetermined characters which has been designated by the unit for designating the allowable number of undetermined characters.

4. The paper sheet management apparatus according to claim 1, comprising:

a specific digit designating unit that designates a given specific digit among the predetermined digits of the identification information recognition result; and a unit for designating an allowable number of undetermined characters among the predetermined digits of the identification information recognition result;

wherein the registration condition judgment unit judges that: the identification information recognition result meets the predetermined registration condition when a character of the specific digit in the identification information recognition result, which has been designated by the specific digit designating unit, is the determined character, and when a total number of the undetermined characters in the identification information recognition result is equal to or less than the allowable number of undetermined characters which has been designated by the unit for designating the allowable number of undetermined characters; and judges that the identification information recognition result does not meet the predetermined registration condition when a character of the specific digit in the identification information recognition result, which has been designated by the specific digit designating unit, is the undetermined character, or when the total number of the undetermined characters in the identification information recognition result exceeds the allowable number of undetermined characters which has been designated by the unit for designating the allowable number of undetermined characters.

5. The paper sheet management apparatus according to claim 1, comprising an inputting operation demanding unit that demands an inputting operation relating to the identification information recognition result, when the registration control unit judges that the identification information recognition result does not meet the predetermined registration condition, wherein, when an inputting operation relating to the identification information recognition result in response to the inputting operation demanding unit is detected, the registration control unit registers the inputted identification information in the database.

6. The paper sheet management apparatus according to claim 1, comprising:

an information-to-be-searched inputting unit that inputs identification information to be searched; and a search control unit that searches an identification information recognition result approximate to the identification information to be searched which has been inputted by the information-to-be-searched inputting unit, from the identification information recognition result including the determined character and/or the undetermined character registered in the database.

7. The paper sheet management apparatus according to claim 1, wherein the identification information recognizing unit includes:

a character recognizing unit that performs a character recognition on a plurality of pieces of identification information of the same contents from the paper sheet, and obtains character recognition results about the respective identification information including a recognizable character and/or an unrecognizable character;

a comparing unit that compares the character recognition results of the respective identification information for each digit, which have been obtained by the character recognizing unit;

a character determining unit that determines, when all the characters of the corresponding digit in the character recognition results which have been compared with each other by the comparing unit are the same recognizable character, the character as the determined character of the corresponding digit; when characters of the corresponding digit in the character recognition results are different characters including at least one recognizable character, the character determining unit determines a given character among these different characters as the determined character of the corresponding digit; and when all the characters of the corresponding digit in the character recognition results are unrecognizable characters, the character determining unit determines the character as the undetermined character of the corresponding digit; and an identification information recognition result obtaining unit that obtains the identification information recognition result including the determined character and/or the undetermined character, after the characters of all the digits in the character recognition results have been determined by the character determining unit.

8. The paper sheet management apparatus according to claim 7, wherein when the characters of the corresponding digit in the character recognition results are different characters including at least one recognizable character, and a given character among these different characters is determined as the determined character of the corresponding digit, the character determining unit determines, as the determined character of the corresponding digit, a character of the corresponding digit in the character recognition result having the smallest total number of the unrecognizable characters among the plurality of character recognition results.

9. The paper sheet management apparatus according to claim 7, comprising a priority order storage unit that stores a priority order of the plurality of identification information having the same contents on the paper sheet, wherein when the characters of the corresponding digit in the character recognition results are different characters including at least one recognizable character, and a given character among these different characters is determined as the determined character of the corresponding digit, the character determining unit determines, as the determined character of the corresponding digit, a character of the corresponding digit of the character recognition result whose priority order is higher, and which is stored in the priority storage unit, among the plurality of character recognition results.

10. The paper sheet management apparatus according to claim 7, comprising:

a coincide rate calculating unit that calculates a coincidence rate in which the recognizable characters of the corresponding digit in the plurality of character recognition results, which have been compared with each other by the comparing unit, coincide with each other; and an allowable coincidence rate designating unit that designates an allowable coincidence rate; wherein the registration condition judgment unit judges that the identification information recognition result does not meet the predetermined registration condition, when the coincidence rate which has been calculated by the coincidence rate calculating unit does not exceeds the allowable coincidence rate which has been designated by the allowable coincidence rate designating unit.

11. The paper sheet management apparatus according to claim 7, comprising:

an information-to-be-searched inputting unit that inputs identification information to be searched; and a search control unit that searches an identification information recognition result approximate to the identification information to be searched which has been inputted by the information-to-be-searched inputting unit, among one or more identification information recognizing results including the determined character and/or the undetermined character registered in the database.

12. The paper sheet management apparatus according to claim 1, wherein the identification information recognizing unit includes:

a character recognizing unit that performs a character recognition on a plurality of pieces of identification information of the same contents from the paper sheet, and obtains character recognition results about the respective identification information including a recognizable character and/or an unrecognizable character;

a comparing unit that compares the character recognition results of the respective identification information for each digit, which have been obtained by the character recognizing unit;

a character determining unit that determines the determined character and/or the undetermined character by the characters of all the digits in the character recognition result having the smallest total number of the unrecognizable characters among the plurality of character recognition results which have been compared with each other by the comparing unit; and an identification information recognition result obtaining unit that obtains the identification information recognition result including the determined character and/or the undetermined character, after the characters of all the digits in the character recognition results have been determined by the character determining unit.

13. A paper sheet management method comprising:

performing a character recognition based on identification information of a paper sheet, composed of predetermined digits for recognizing a paper sheet, obtaining a character recognition result including a recognizable character and/or an unrecognizable character, and obtaining an identification information recognition result including a recognizable determined character and/or an unrecognizable undetermined character based on the obtained character recognition result;

judging whether or not the identification information recognition result meets a predetermined registration condition, based on the determined character or the undetermined character in the obtained identification information recognition result; and registering the identification information recognition result in a database when the identification information recognition result is judged to meet the predetermined registration condition even though the identification information recognition result includes the undetermined character, and forbidding registration of the identification information recognition result in the database when the identification information recognition result is judged not to meet the predetermined registration condition.

14. A non-transitory computer storage medium having stored thereon a paper sheet management program that causes a processing program to be executed by a computer device, the processing program comprising:

performing a character recognition based on identification information of a paper sheet, composed of predetermined digits for recognizing a paper sheet, obtaining a character recognition result including a recognizable character and/or an unrecognizable character, and obtaining an identification information recognition result including a recognizable determined character and/or an unrecognizable undetermined character based on the obtained character recognition result;

judging whether the identification information recognition result meets a predetermined registration condition or not, based on the determined character or the undetermined character in the obtained identification information recognition result; and registering the identification information recognition result in a database when the identification information recognition result is judged to meet the predetermined registration condition even though the identification information recognition result includes the undetermined character, and forbidding registration of the identification information recognition result in the database when the identification information recognition result is judged not to meet the predetermined registration condition.

* * * * *